(12) United States Patent
Upchurch

(10) Patent No.: US 11,334,147 B1
(45) Date of Patent: May 17, 2022

(54) VISUAL QUESTION AND ANSWER BASED TRAINING AND RUNTIME METHODS

(71) Applicant: Apple Inc., Cupertino, CA (US)

(72) Inventor: Paul R. Upchurch, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/383,313

(22) Filed: Jul. 22, 2021

Related U.S. Application Data

(60) Provisional application No. 63/057,075, filed on Jul. 27, 2020.

(51) Int. Cl.
*G06F 3/01* (2006.01)
*G06F 3/04847* (2022.01)
*G06F 3/0482* (2013.01)

(52) U.S. Cl.
CPC ........... *G06F 3/011* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2014/0002492 A1* | 1/2014 | Lamb ................. | G06F 3/0304 345/633 |
| 2016/0217590 A1* | 7/2016 | Mullins .............. | G06T 7/40 |
| 2020/0211243 A1* | 7/2020 | Ulusoy ............... | G06T 11/60 |
| 2021/0251263 A1* | 8/2021 | Knighton ............ | G06N 20/00 |

OTHER PUBLICATIONS

Qi Wu et al., "Visual Question Answering: A Survey of Methods and Datasets," Computer Vision and Image Understanding, vol. 163, 2017, pp. 21-40.

* cited by examiner

*Primary Examiner* — Christopher J Kohlman
(74) *Attorney, Agent, or Firm* — Fernando & Partners, LLP

(57) ABSTRACT

In some implementations, a runtime method is performed at a virtual effect system. The method includes: obtaining an image of an environment; obtaining a virtual action associated with one or more virtual effect instructions; generating, by an ML system, at least one estimated material property response to the one or more virtual effect instructions for at least a portion of the image of the environment; generating one or more virtual effect visualizations for at least the portion of the image of the environment based on the at least one estimated material property response to the one or more virtual effect instructions; and causing presentation of the one or more virtual effect visualizations for at least the portion of the image of the environment.

21 Claims, 17 Drawing Sheets

| Reference Image 402 {EG, photosynthetic or real-world image} | Object Mask 404 {EG, wood pile} | Virtual Action 406 {EG, flame applicator} | Annotations 455 | |
|---|---|---|---|---|
| | | | VQAQ 410: Should the object exhibit visual flames when the virtual action is applied? | VQAA 411: Yes. |
| | | | VQAQ 412: What should be the intensity of the flames? | VQAA 413: Scalar vaue. |
| | | | VQAQ 414: How many flames should exist? | VQAA 415: 3 |
| | | | VQAQ 420: Should the object exhibit a visual glow when the virtual action is applied? | VQAA 421: Yes. |
| | | | VQAQ 422: What should be the intensity of the glow? | VQAA 423: Scalar vaue. |
| | | | VQAQ 430: Should an audible snap & crackle occur when the virtual action is applied? | VQAA 431: Yes. |
| | | | VQAQ 432: What should be the intensity of the audible snap & crackle? | VQAA 433: Scalar vaue. |

Annotations grouped as:
- Virtual Effect Instruction 452A (visual flames): VQAQ/VQAA 410–415
- Virtual Effect Instruction 452B (visual glow): VQAQ/VQAA 420–423
- Virtual Effect Instruction 452C (audible snap & crackle): VQAQ/VQAA 430–433

840

VISUAL QUESTION AND ANSWER BASED TRAINING AND RUNTIME METHODS

CROSS-REFERENCE TO RELATED APPLICATIONS

This application claims the benefit of U.S. Provisional Patent App. No. 63/057,075, filed on Jul. 27, 2020, which is incorporated by reference in its entirety.

TECHNICAL FIELD

The present disclosure generally relates to a visual question and answer (VQA) technique, and in particular, to systems, methods, and devices for training a machine learning (ML) system to apply virtual effects using a training dataset generated based on VQA data.

BACKGROUND

In some instances, when viewing virtual content (sometimes also herein referred to as "extended reality (XR) content") overlaid on a physical environment, a user may expect a virtual action to affect the physical environment. For example, a user viewing a physical fireplace may initiate a virtual action to light a fireplace and expect one or more accompanying virtual effects such as a visual glow, visual flames, visual smoke, crackling sounds, and/or the like. Current systems lack logic to present virtual effects to a user interacting with a representation of the physical environment, and current systems also lack logic to present virtual effects to a user in real-time while the user interacts with the representation of the physical environment (e.g., the XR content).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4B is an example data structure for a portion of the training dataset in accordance with some implementations.

Figure 1:
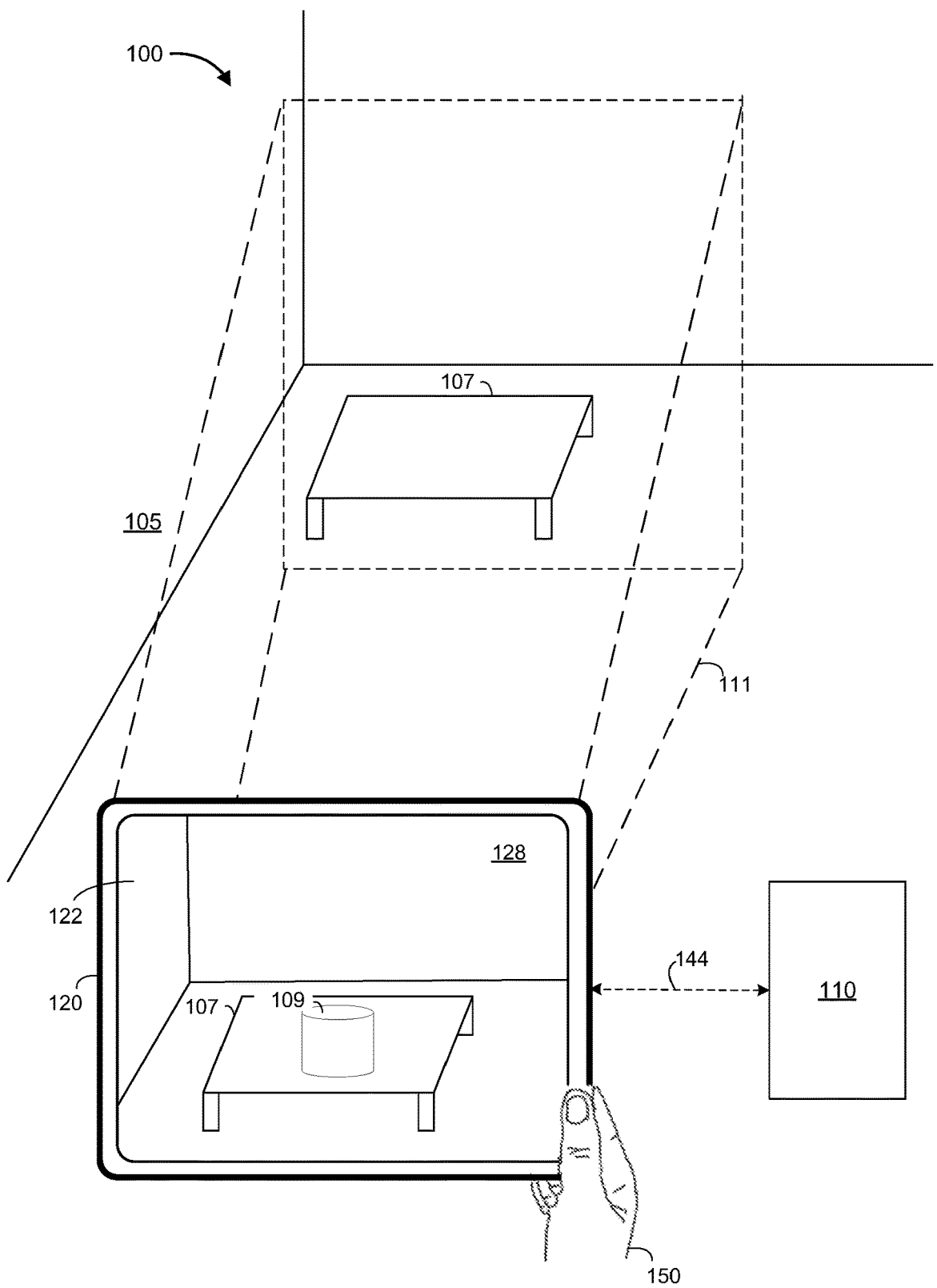
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for training a virtual effect system and using the trained virtual effect system during runtime. According some implementations, a training method described herein trains a virtual effect system to apply one or more virtual effects to a particular physical surface or object within a physical environment by using generated training data associated with various material properties. Furthermore, according some implementations, a runtime method described herein enables a trained virtual effect system to identify a portion of an image associated with a virtual action and apply the virtual effects to the portion of the image during runtime.

According to some implementations, the method is performed by a virtual effect system including one or more processors, a non-transitory memory, a machine learning (ML) system, a comparison engine, and a training engine. The method includes: generating, by the ML system, at least one estimated material property response to a virtual action for a portion of a reference image, wherein the reference image is obtained from a training dataset and the reference image is associated with at least one annotation including a training material property response to the virtual action for the portion of the reference image; comparing, by the comparison engine, the at least one estimated material property response to the virtual action for the portion of the reference image against the training material property response to the virtual action for the portion of the reference image to generate an error value; and adjusting, by the training engine, operating parameters of the ML system according to a determination that the error value satisfies an error threshold.

Various implementations disclosed herein include devices, systems, and methods for causing the application of a virtual effect. According to some implementations, the method is performed by a virtual effect system including non-transitory memory, one or more processors coupled with the non-transitory memory, an ML system, one or more input devices, and one or more output devices. The method includes: obtaining, via the one or more input devices, an image of an environment; obtaining, via the one or more input devices, a virtual action associated with one or more virtual effect instructions; generating, by the ML system, at least one estimated material property response to the one or more virtual effect instructions for at least a portion of the image of the environment; generating one or more virtual effect visualizations for at least the portion of the image of the environment based on the at least one estimated material property response to the one or more virtual effect instructions; and causing presentation of the one or more virtual effect visualizations for at least the portion of the image of the environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some embodiments, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some embodiments, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIGS. 2A and 2B. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. For example, the electronic device 120 corresponds to a mobile phone, tablet, laptop, wearable computing device, or the like.

According to some implementations, the electronic device 120 presents an XR experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (sometimes also referred to herein as "graphical content" or "virtual content"), including an XR cylinder 109, onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2A:
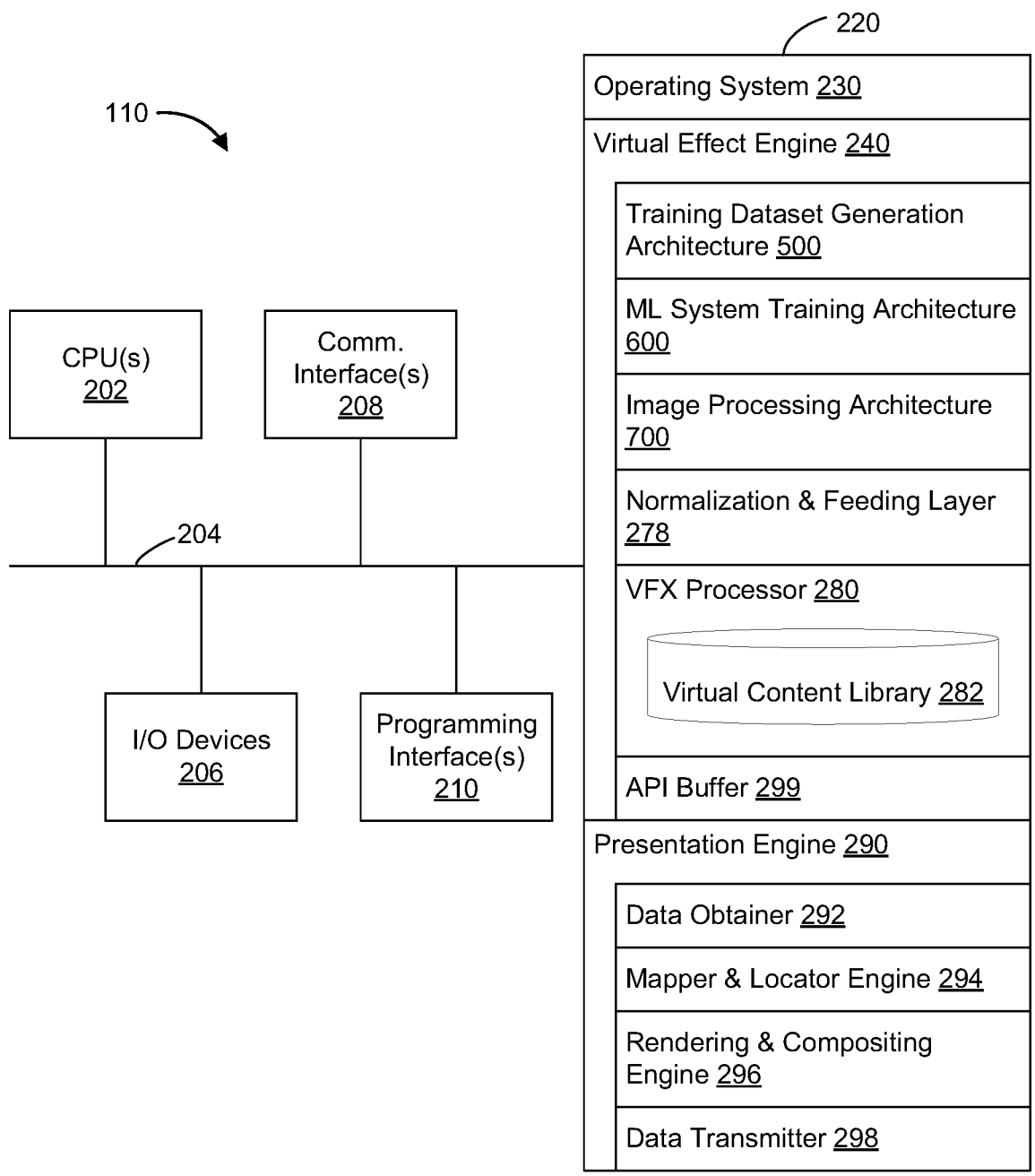
FIG. 2A is a block diagram of an example controller in accordance with some implementations.

FIG. 2A is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a virtual effect engine 240, and a presentation engine 290.

The operating system 230 includes procedures for handling various basic system services and for performing hardware dependent tasks.

In some implementations, the virtual effect engine 240 is configured to train a machine learning (ML) system based on a training dataset. In some implementations, the virtual effect engine 240 is configured to use the trained ML system during runtime to apply one or more virtual effects to a particular surface or object within an environment (e.g., a physical environment, a partially XR environment, a fully XR environment, or the like).

In some implementations, the virtual effect engine 240 includes a training dataset generation architecture 500, an ML system training architecture 600, an image processing architecture 700, a normalization and feeding layer 278, a virtual effect (VFX) processor 280, and an optional application programming interface (API) buffer 299.

Figure 2B:
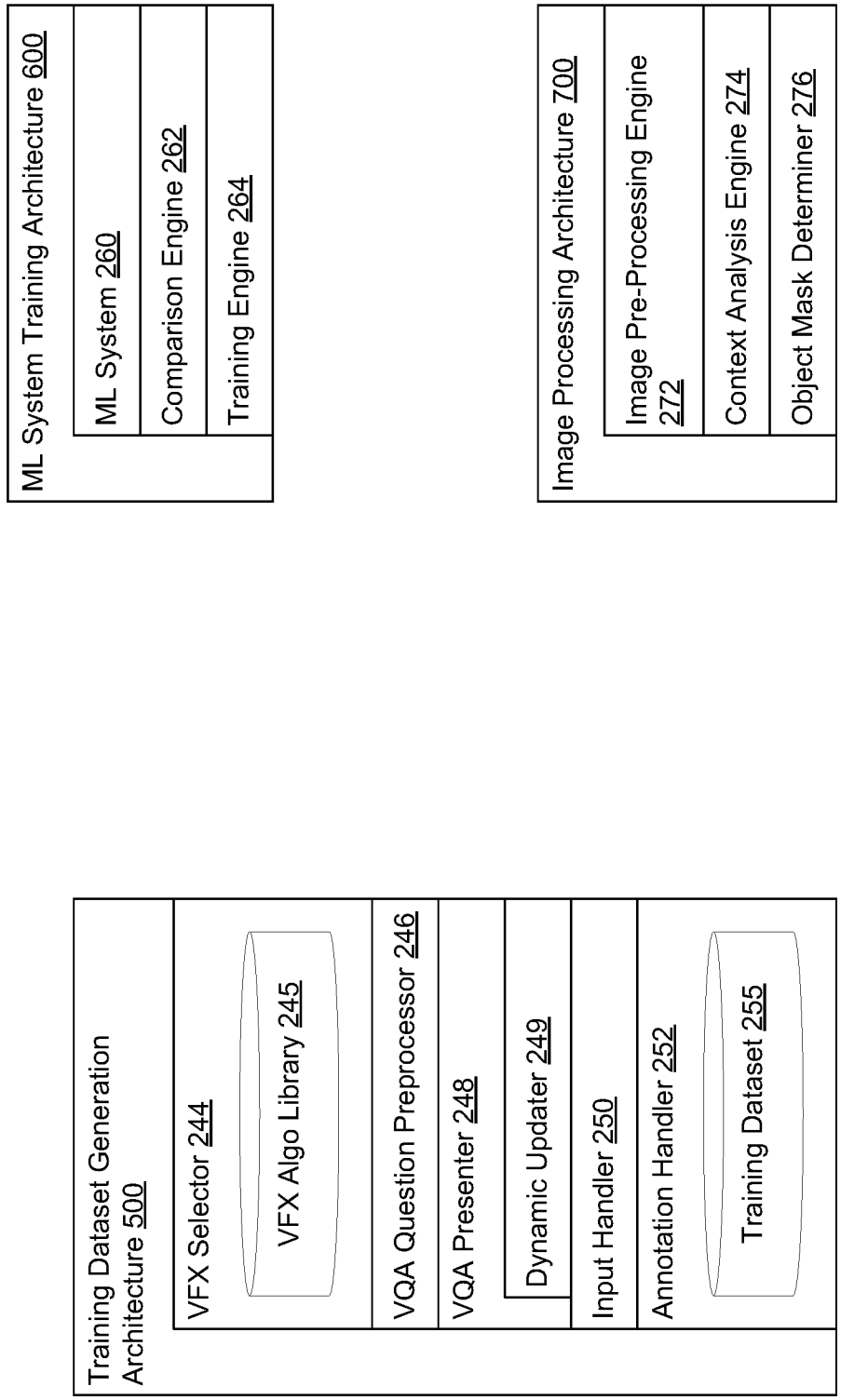
FIG. 2B illustrates block diagrams associated with the controller in FIG. 2A in accordance with some implementations.

In some implementations, the training dataset generation architecture 500 is configured to generate the training dataset that is used to train the ML system. The training dataset generation architecture 500 is described in more detail below with reference to FIG. 5. As shown in FIG. 2B, the training dataset generation architecture 500 includes a VFX selector 244, a visual-question-and-answer (VQA) question preprocessor 246, a VQA presenter 248, an input handler 250, and an annotation handler 252.

In some implementations, the VFX selector 244 is configured to obtain (e.g., receive, retrieve, or determine) one or more virtual effect instructions from a VFX algorithm library 245 based on an input virtual action. As one example, if the input virtual action corresponds to a flame applicator virtual action, the one or more virtual effect instructions may correspond to ignition, bubbling, glowing, smoking, burning, and/or the like. In some implementations, the input virtual action is provided or selected by a human user. In some implementations, the input virtual action is pseudo-randomly selected by the controller 110. In some implementations, the VFX algorithm library 245 includes a plurality of virtual actions which are each associated with one or more virtual effect instructions. As such, as one example, the VFX selector 244 performs a look-up operation against the VFX algorithm library 245 in order to determine the one or more virtual effect instructions. In some implementations, the VFX algorithm library 245 is locally and/or remotely stored. To that end, in various implementations, the VFX selector 244 includes instructions and/or logic therefor, and heuristics and metadata therefor.

In some implementations, the VQA question preprocessor 246 is configured to obtain (e.g., receive, retrieve, or determine/generate) one or more VQA questions based on the one or more virtual effect instructions. As such, as one example, the VQA question preprocessor 246 performs a look-up operation in order to determine the one or more VQA questions. As another example, the VQA question preprocessor 246 generates the one or more VQA questions on-the-fly. To that end, in various implementations, the VQA question preprocessor 246 includes instructions and/or logic therefor, and heuristics and metadata therefor. One of ordinary skill in the art will appreciate that the functions and/or operations of the VFX selector 244 and the VQA question preprocessor 246 may be combined in various implementations.

In some implementations, the VQA presenter 248 is configured to present a reference image along with an annotation prompt window while generating the training dataset 255 in order to solicit VQA answers to the VQA questions from a user. To that end, in various implementations, the VQA presenter 248 includes instructions and/or logic therefor, and heuristics and metadata therefor.

In some implementations, the VQA presenter 248 includes a dynamic updater 249, which is configured to dynamically update the reference image based on the VQA answers to the VQA questions from the user. Live previews and the annotation process for generating the training dataset 255 is described in more detail below with reference to FIGS. 4A and 4B.

In some implementations, the input handler 250 is configured to obtain (e.g., receive, retrieve, or detect) user inputs that correspond to the VQA answers from the user to the VQA questions. For example, the user inputs correspond to voice commands, gestural inputs, eye tracking inputs, limb/hand tracking inputs, and/or the like. As another example, the user inputs correspond to selection and/or manipulation of various affordances such as radio buttons, sliders, and/or the like. As yet another example, the user inputs correspond to text entry into a user modifiable text entry field. The annotation process for generating the training dataset 255 is described in more detail below with reference to FIGS. 4A and 4B. To that end, in various implementations, the input handler 250 includes instructions and/or logic therefor, and heuristics and metadata therefor.

In some implementations, the annotation handler 252 is configured to associate the reference image with a plurality of annotations therefor within the training dataset 255. For example, the plurality of annotations includes at least one of an object mask, the virtual action, the VQA questions, and the VQA answers. A portion of the training dataset 255 is described below in more detail with reference to FIG. 4B. To that end, in various implementations, the annotation handler 252 includes instructions and/or logic therefor, and heuristics and metadata therefor.

Although the portions of the training dataset generation architecture 500, including the VFX selector 244, the VQA question preprocessor 246, the VQA presenter 248, the input handler 250, and the annotation handler 252, are shown as residing on a single device (e.g., the controller 110), it should be understood that in other implementations, any combination of the VFX selector 244, the VQA question preprocessor 246, the VQA presenter 248, the input handler 250, and the annotation handler 252 may be located in separate computing devices.

In some implementations, the ML system training architecture 600 is configured to train the ML system based on the training dataset 255. The ML system training architecture 600 is described in more detail below with reference to FIG. 6. As shown in FIG. 2B, the ML system training architecture 600 includes an ML system 260, a comparison engine 262, and a training engine 264.

In some implementations, the ML system 260 corresponds to a neural network (NN), a convolutional neural network (CNN), a deep neural network (DNN), a recurrent neural network (RNN), a state vector machine (SVM), a random forest, or the like. In some implementations, the ML system training architecture 600 provides a reference image, an optional object mask, the virtual action, and the VQA questions to the ML system 260. In some implementations, the ML system 260 outputs estimated VQA answers with respect to the reference image or the optional object mask. The training process for the ML system 260 is described below in more detail with reference to FIG. 6.

In some implementations, the comparison engine 262 is configured to compare the estimated VQA answers to known VQA answers within the training dataset 255. In some implementations, the comparison engine 262 is also configured to obtain (e.g., determine, generate, etc.) an error value that corresponds to a difference between the estimated VQA answers output by the ML system 260 and the known VQA answers within the training dataset 255. To that end, in various implementations, the comparison engine 262 includes instructions and/or logic therefor, and heuristics and metadata therefor.

In some implementations, the training engine 264 is configured to adjust one or more operating parameters of the ML system 260 (e.g., filter weights and/or the like) according to a determination that the error value satisfies an error threshold. In some implementations, the training engine 264 is configured to end the training process and not adjust (e.g., forgo adjusting) the one or more operating parameters of the ML system 260 according to a determination that the error value does not satisfy the error threshold. In some implementations, the operating parameters correspond to filter weights of a neural network. In some implementations, the error threshold corresponds to a predefined value associated with the accuracy of confidence in the result of the ML system 260. In some implementations, the error threshold corresponds to a deterministic value associated with the accuracy of confidence in the result of the ML system 260. To that end, in various implementations, the training engine 264 includes instructions and/or logic therefor, and heuristics and metadata therefor.

Although the portions of the ML system training architecture 600, including the ML system 260, the comparison engine 262, and the training engine 264, are shown as residing on a single device (e.g., the controller 110), it should be understood that in other implementations, any combination of the ML system 260, the comparison engine 262, and the training engine 264 may be located in separate computing devices.

In some implementations, the image processing architecture 700 is configured to perform image pre-processing and/or optional contextual analysis during runtime. The image processing architecture 700 is described in more detail below with reference to FIG. 7A. As shown in FIG. 2B, the image processing architecture 700 includes an image pre-processing engine 272, a context analysis engine 274, and an object mask determiner 276.

In some implementations, the image pre-processing engine 272 is configured to obtain (e.g., receive, retrieve, or capture) an image stream of an environment. In some implementations, the image stream corresponds to a sequence of sporadic images, a live video feed, and/or the like. In some implementations, the environment corresponds to a physical environment, a partially XR environment, a fully XR environment, or the like. In some implementations, the image pre-processing engine 272 is also configured to perform one or more pre-processing operations on the image stream such as warping, noise reduction, white balance, color correction, gamma correction, sharpening, and/or the like. To that end, in various implementations, the image pre-processing engine 272 includes instructions and/or logic therefor, and heuristics and metadata therefor.

In some implementations, the context analysis engine 274 is configured to obtain (e.g., receive, retrieve, or determine/generate) a contextual information vector based on position/rotation/movement information, a gaze direction, body/head/hand/limb pose information, user input information, and/or the like based on data collected from a localization and mapping engine, an eye tracking engine, a body/head pose tracking engine, a hand/limb tracking engine, a camera pose tracking engine, and/or the like. To that end, in various implementations, the context analysis engine 274 includes instructions and/or logic therefor, and heuristics and metadata therefor.

In some implementations, the object mask determiner 276 is configured to obtain (e.g., receive, retrieve, or determine/generate) an object mask for at least one image in the image stream based on the contextual information vector. For example, the object mask corresponds to an object within the image stream that the user intends to interact with such as a physical object, a partially XR object, or a fully XR item/object within the environment. To that end, in various implementations, the object mask determiner 276 includes instructions and/or logic therefor, and heuristics and metadata therefor.

Although the portions of the image processing architecture 700, including the image pre-processing engine 272, the context analysis engine 274, and the object mask determiner 276, are shown as residing on a single device (e.g., the controller 110), it should be understood that in other implementations, any combination of the image pre-processing engine 272, the context analysis engine 274, and the object mask determiner 276 may be located in separate computing devices.

In some implementations, the virtual effect engine 240 further includes the normalization and feeding layer 278, the VFX processor 280, and the API buffer 299, which are described in more detail below with reference to FIGS. 7B and 7C.

In some implementations, the normalization and feeding layer 278 is configured to obtain (e.g., receive, retrieve, or the like) estimated VQA answers from the ML system 260 during runtime. In some implementations, the normalization and feeding layer 278 is also configured to normalize the values (or the like) associated with the estimated VQA answers and feed the normalized values (or the like) to the appropriate virtual effect algorithms of the VFX processor 280. To that end, in various implementations, the normalization and feeding layer 278 includes instructions and/or logic therefor, and heuristics and metadata therefor.

In some implementations, the VFX processor 280 is configured to obtain (e.g., receive, retrieve, or determine/generate) one or more virtual effect visualizations based on the estimated VQA answers from the ML system 260 (or the normalized values or the like thereof) and a virtual content library 282. In some implementations, the VFX processor 280 includes or is associated with a plurality of virtual effect algorithms 281A, 281B, 281C, . . . as shown in FIG. 7B. In some implementations, the virtual content library 282 includes pre-authored XR content for various virtual effect instructions and/or virtual actions. In some implementations, the virtual content library 282 is locally and/or remotely stored. To that end, in various implementations, the VFX processor 280 includes instructions and/or logic therefor, and heuristics and metadata therefor.

In some implementations, the API buffer 299 is configured to provide the estimated VQA answers from the ML system 260 in an accessible manner to other applications, developers, and/or the like. In some implementations, the API buffer 299 is an alternative to the combination of the normalization and feeding layer 278 and the VFX processor 280.

In some implementations, the presentation engine 290 is configured to generate, modify, and update an XR environment. As shown in FIG. 2A, the presentation engine 290 includes a data obtainer 292, a mapper and locator engine 294, a rendering and compositing engine 296, and a data transmitter 298.

In some implementations, the data obtainer 292 is configured to obtain data (e.g., presentation data, input data, user interaction data, head/body tracking information, hand/limb tracking information, camera pose tracking information, eye tracking information, sensor data, location data, etc.) from at least one of the I/O devices 206 of the controller 110, the electronic device 120, and the optional remote input devices. To that end, in various implementations, the data obtainer 292 includes instructions and/or logic therefor, and heuristics and metadata therefor.

In some implementations, the mapper and locator engine 294 is configured to map the physical environment 105 and to track the position/location of at least the electronic device 120 with respect to the physical environment 105. To that end, in various implementations, the mapper and locator engine 294 includes instructions and/or logic therefor, and heuristics and metadata therefor.

In some implementations, the rendering and compositing engine 296 is configured to render the one or more virtual effect visualizations and optionally composite the one or more virtual effect visualizations with the physical environment 105. To that end, in various implementations, the rendering and compositing engine 296 includes instructions and/or logic therefor, and heuristics and metadata therefor.

In some implementations, the data transmitter 298 is configured to transmit data (e.g., presentation data such as rendered image frames associated with the XR environment, location data, etc.) to at least the electronic device 120. To that end, in various implementations, the data transmitter 298 includes instructions and/or logic therefor, and heuristics and metadata therefor.

Although the data obtainer 292, the mapper and locator engine 294, the rendering and compositing engine 296, and the data transmitter 298 are shown as residing on a single device (e.g., the controller 110), it should be understood that in other implementations, any combination of the data obtainer 292, the mapper and locator engine 294, the rendering and compositing engine 296, and the data transmitter 298 may be located in separate computing devices.

In some implementations, the functions and/or components of the controller 110 are combined with or provided by the electronic device 120 shown below in FIG. 3. Moreover, FIG. 2A is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
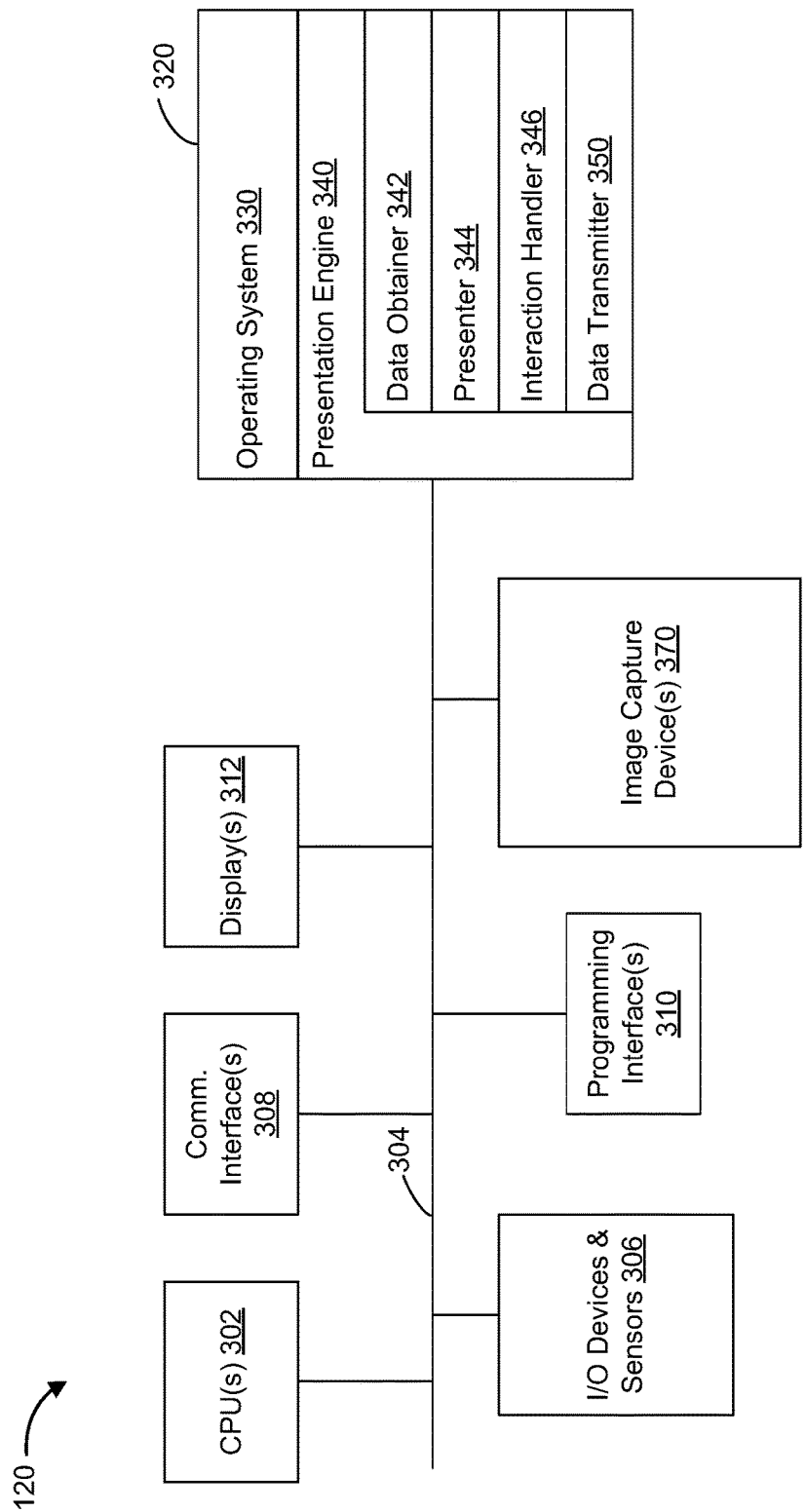
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior-facing and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), a localization and mapping engine, an eye tracking engine, a body/head pose tracking engine, a hand/limb tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. In some implementations, the XR presentation engine 340 is configured to present XR content to the user via the one or more displays 312. To that end, in various implementations, the XR presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update XR content (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented XR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
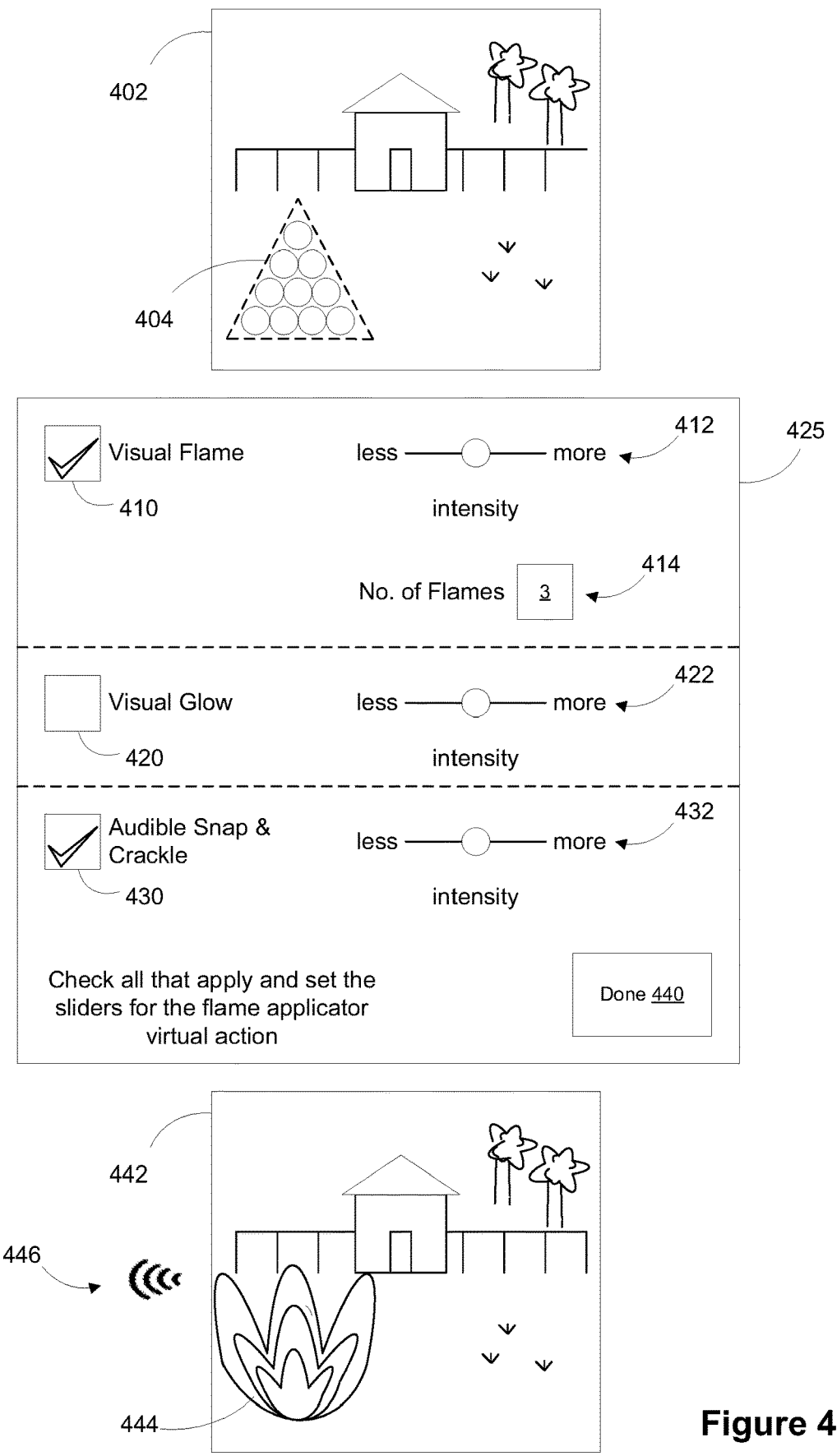
FIG. 4A illustrates various user interfaces associated with generating a training dataset in accordance with some implementations.

FIG. 4A illustrates various user interfaces associated with generating a training dataset in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the user interfaces and/or images described herein are obtained (e.g., received, retrieved, and/or generated) and presented by a virtual effect system with at least one or more processors, a non-transitory memory, and a machine learning (ML) system (e.g., the controller 110 in FIGS. 1 and 2A, the electronic device 120 in FIGS. 1 and 3, or a suitable combination thereof).

As shown in FIG. 4A, while generating the training dataset 255, the virtual effect system presents a reference image 402 to a user with an accompanying object mask 404 that highlights or surrounds a wood pile within the reference image 402. As shown in FIG. 4A, while generating the training dataset 255, the virtual effect system presents an annotation prompt window 425 in concert with the reference image 402. In some implementations, the virtual effect system is configured to detect user inputs provided to the user manipulatable portions of the annotation prompt window 425 such as voice commands, eye tracking inputs, user touch inputs, gestural inputs, and/or the like.

As shown in FIG. 4A, the annotation prompt window 425 is associated with a virtual action that corresponds to applying a flame applicator to the object mask 404 (e.g., the wood pile). In this example, the flame applicator virtual action is associated with a plurality of virtual effect instructions: one or more visual flames, a visual glow, and an audible snap and crackle. As such, the annotation prompt window 425 includes VQA questions associated with the plurality of virtual effect instructions including a first radio button 410 indicating a binary VQA question as to whether or not the wood pile should exhibit one or more visual flames when the virtual action is applied thereto, a second radio button 420 indicating a binary VQA question as to whether or not the wood pile should exhibit a visual glow when the virtual action is applied thereto, and a third radio button 430 indicating a binary VQA question as to whether or not an audible snap and crackle should occur when the virtual action is applied thereto. As shown in FIG. 4A, the first radio button 410 is currently set to the "on" position, the second radio button 420 is currently set to the "off" position, and the third radio button 430 is currently set to the "on" position.

As shown in FIG. 4A, the annotation prompt window 425 includes a user manipulatable slider 412 associated with the intensity of the visual flames and a user manipulatable text entry field 414 associated with the number of visual flames. As shown in FIG. 4A, the user manipulatable slider 412 is currently set to a middle position, and the text entry field 414 includes the number "3".

As shown in FIG. 4A, the annotation prompt window 425 also includes a user manipulatable slider 422 associated with the intensity of the visual glow and a user manipulatable slider 432 associated with the intensity of the audible snap and crackle. As shown in FIG. 4A, the user manipulatable slider 422 is currently set to a middle position, and the user manipulatable slider 432 is also currently set to a middle position.

As shown in FIG. 4A, the virtual effect system updates the reference image based on the values associated with the user manipulatable portions of the annotation prompt window 425 in order to provide a live preview of the application of the virtual action to the object mask 404. For example, the updated reference image 442 illustrates a visual flame 444 overlaid on the object mask 404 and the audible snap and crackle 446.

Furthermore, the annotation prompt window 425 includes a done affordance 440, which, when selected (e.g., with a tap input, voice input, or the like), causes the virtual effect system to finalize the annotations to the reference image 402 (e.g., the values associated with the user manipulatable portions of the annotation prompt window 425) and store the annotations in association with the reference image 402 in the training dataset 255. One of ordinary skill in the art will appreciate that the annotation prompt window 425 shown in FIG. 4A is merely an example user interface and that the annotation prompt window 425 may be structured or presented in myriad ways.

FIG. 4B is an example data structure for a portion 450 of the training dataset 255 for a reference image 402 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the portion 450 of the training dataset 255 for the reference image 402 includes the reference image 402, the object mask 404 (e.g., the wood pile), an indication of the virtual action 406 (e.g., flame applicator), and the annotations 455.

As one example, the annotations 455 may be grouped based on their associated virtual effect instructions such a first virtual effect instruction 452A associated with one or more visual flames for the virtual action 406, a second virtual effect instruction 452B associated with a visual glow for the virtual action 406, and a third virtual effect instruction 452C associated with an audible snap and crackle for the virtual action 406. One of ordinary skill in the art will appreciate that the portion 450 of the training dataset 255 for the reference image 402 shown in FIG. 4B is merely an example data structure and that the portion 450 of the training dataset 255 for the reference image 402 may be structured in myriad ways.

As shown in FIG. 4B, the annotations 455 include VQA questions (VQAQs) 410, 412, and 414 associated with the first virtual effect instruction 452A and the VQA answers (VQAAs) 411, 413, and 415 related respectively thereto based on the values associated with the user manipulatable portions of the annotation prompt window 425 in FIG. 4A.

As shown in FIG. 4B, the annotations 455 also include VQAQs 420 and 422 associated with the second virtual effect instruction 452B and the VQAAs 421 and 423 related respectively thereto based on the values associated with the user manipulatable portions of the annotation prompt window 425 in FIG. 4A.

As shown in FIG. 4B, the annotations 455 further include VQAQs 430 and 432 associated with the second virtual effect instruction 452C and the VQAAs 431 and 433 related respectively thereto based on the values associated with the user manipulatable portions of the annotation prompt window 425 in FIG. 4A. As such, for example, the training dataset 255 may include a plurality of reference images each with a set of annotations provided by the user via the VQA annotation process described above.

Figure 5:
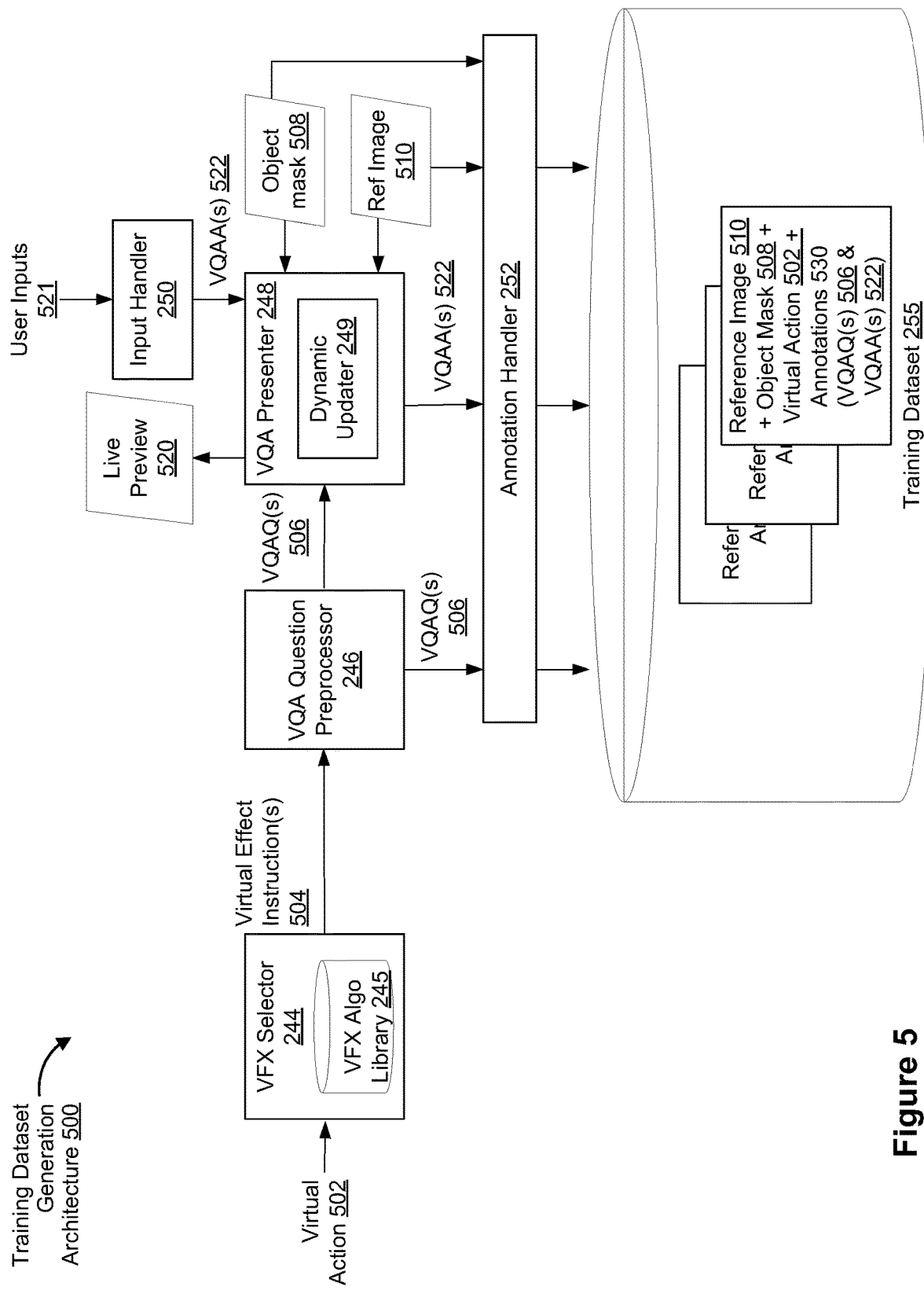
FIG. 5 is a block diagram of an example training dataset generation architecture in accordance with some implementations.

FIG. 5 is a block diagram of an example training dataset generation architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, a virtual effect system with at least one or more processors, a non-transitory memory, and a machine learning (ML) system (e.g., the controller 110 in FIGS. 1 and 2A, the electronic device 120 in FIGS. 1 and 3, or a suitable combination thereof) generates the training dataset 255.

To that end, as shown in FIG. 5, the VFX selector 244 obtains (e.g., receives, retrieves, or determines) one or more virtual effect instructions 504 from the VFX algorithm library 245 based on the input virtual action 502. As one example, with reference to FIG. 4A, if the input virtual action 502 corresponds to a flame applicator virtual action, the one or more virtual effect instructions may correspond to one or more visual flames, a visual glow, and an audible snap and crackle (e.g., the virtual effect instructions 452A, 452B, and 452C in FIG. 4B) In some implementations, the input virtual action 502 is provided or selected by a human user. In some implementations, the input virtual action 502 is pseudo-randomly selected by the controller 110. In some implementations, the VFX algorithm library 245 includes a plurality of virtual actions or virtual effect algorithms which are each associated with one or more virtual effect instructions. In some implementations, the VFX algorithm library 245 includes a plurality of virtual effect algorithms 281A, 281B, 281C, . . . as shown in FIG. 7B.

As shown in FIG. 5, the VQA question preprocessor 246 obtains (e.g., receives, retrieves, or determines/generates) one or more VQA questions (VQAQs) 506 based on the one or more virtual effect instructions 504. As one example, the VQA question preprocessor 246 performs a look-up operation in order to determine the one or more VQA questions 506. As another example, the VQA question preprocessor 246 generates the one or more VQA questions 506 on-the-fly by identifying potential VFX algorithms that may occur based on the input virtual action 502.

In some implementations, the virtual effect system obtains (e.g., receives, retrieves, or captures/generates) a reference image 510 from a repository of real world and/or photorealistic synthetic images stored locally and/or remotely. In some implementations, the virtual effect system obtains (e.g., receives, retrieves, or captures/generates) an object mask 508 for the reference image 510.

As shown in FIG. 5, the VQA presenter 248 presents a live preview 520 including the reference image 510 with the object mask 508 and also an annotation prompt window with the one or more VQA questions 506 (e.g., as described above with reference to FIG. 4A). Furthermore, the input handler 250 obtains (e.g., receives, retrieves, or detects) user inputs 521 that correspond to the VQA answers 522 to the VQA questions 506 from the user and the dynamic updater 249 updates the live preview 520 based on the VQA answers 522 to the VQA questions 506. As one example, with reference to FIG. 4A, while generating the training dataset 255, the virtual effect system presents an annotation prompt window 425 in concert with the reference image 402. In some implementations, the virtual effect system is configured to detect user inputs provided to the user manipulatable portions of the annotation prompt window 425 such as voice commands, eye tracking inputs, user touch inputs, gestural inputs, and/or the like.

As shown in FIG. 5, the annotation handler 252 associates the reference image 510 with the object mask 508, the virtual action 502, and a plurality of annotations 530 therefor within the training dataset 255. For example, the plurality of annotations 530 includes the VQA questions 506 and the VQA answers 522. A portion 450 of the training dataset 255 is described above in more detail with reference to FIG. 4B. One of ordinary skill in the art will appreciate that the training dataset 255 may be associated with a single domain for task-specific training (e.g., a specific virtual action) or may be constructed for generic training in order to train a multi-task learner.

Figure 6:
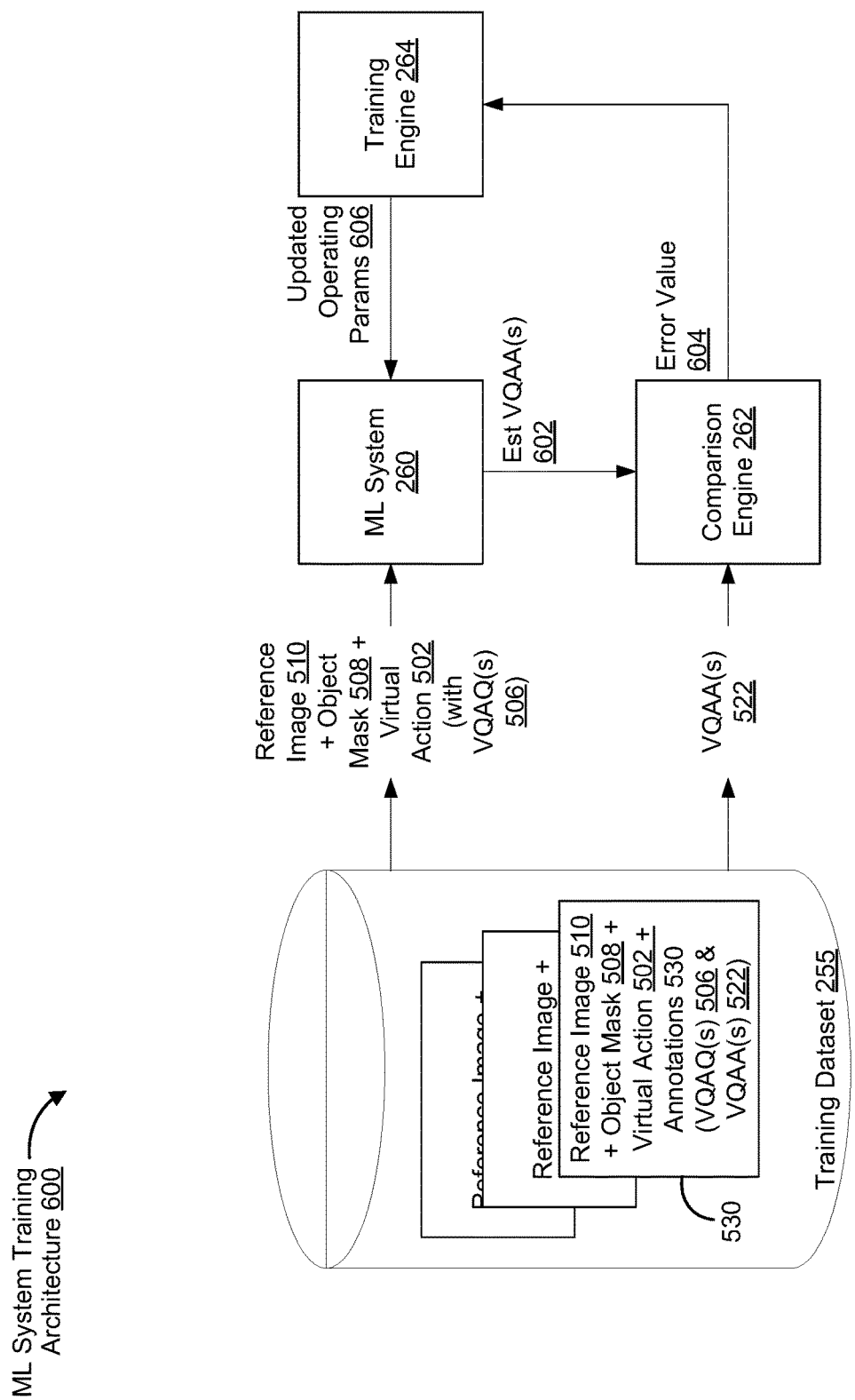
FIG. 6 is a block diagram of an example machine learning (ML) system training architecture in accordance with some implementations.

FIG. 6 is a block diagram of an example machine learning (ML) system training architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the ML system 260 corresponds to an NN, CNN, DNN, RNN, SVM, random forest, or the like.

As shown in FIG. 6, the ML system 260 ingests the reference image 510 along with the object mask 508, the virtual action 502, and the one or more VQA questions 506 and outputs one or more estimated VQA answers 602. As shown in FIG. 6, the comparison engine 262 compares one or more estimated VQA answers 602 to the one or more known VQA answers 522 from the training dataset 255 and obtains (e.g., determines, generates, etc.) an error value 604 that corresponds to a difference between the one or more estimated VQA answers 602 and the one or more known VQA answers 522.

As shown in FIG. 6, the training engine 264 adjusts one or more operating parameters 606 of the ML system 260 (e.g., filter weights and/or the like) according to a determination that the error value 604 satisfies an error threshold. On the other hand, the training engine 264 ends the training process and does not adjust the one or more operating parameters 606 of the ML system 260 according to a determination that the error value 604 does not satisfy the error threshold.

Figure 7A:
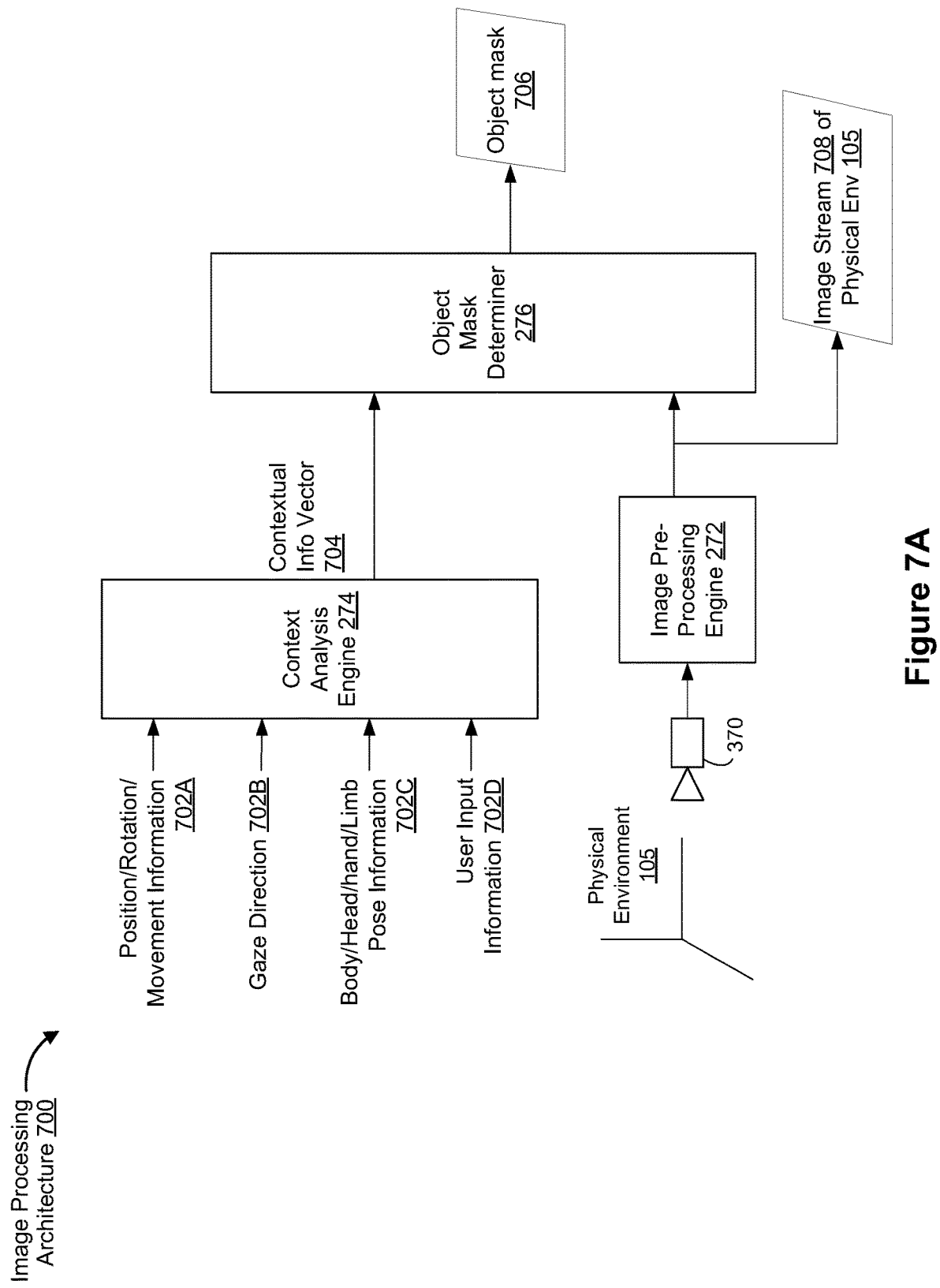
FIG. 7A is a block diagram of an example image processing architecture in accordance with some implementations.

FIG. 7A is a block diagram of an example image processing architecture 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the image capture device 370 captures one or more images of the physical environment 105 (or, alternatively, a partially or fully XR environment). In some implementations, the image pre-processing engine 272 performs one or more pre-processing operations on the images from the image capture device 370, such as warping, noise reduction, white balance, color correction, gamma correction, sharpening, and/or the like, in order to provide an image stream 708 of the physical environment 105.

In some implementations, the context analysis engine 274 obtains (e.g., receives, retrieves, or determines/generates) a contextual information vector 704 based on position/rotation/movement information 702A, a gaze direction 702B, body/head/hand/limb pose information 702C, user input information 702D, and/or the like based on data collected from a localization and mapping engine, an eye tracking engine, a body/head pose tracking engine, a hand/limb tracking engine, a camera pose tracking engine, and/or the like.

In some implementations, the object mask determiner 276 obtains (e.g., receives, retrieves, or determines/generates) an object mask 706 for at least an image of the image stream 708 of the physical environment 105 based on the contextual information vector 704. For example, the object mask 706 corresponds to an object within the image stream that the user intends to interact with such as a physical, partially XR, or fully XR item/object within the environment. As one example, the object mask determiner 276 determines the object mask 706 based on implicit user intention such as the gaze direction 702B. As another example, the object mask determiner 276 determines the object mask 706 based on explicit user input(s) such as a touch input, a pointing gesture, a voice command, or the like.

Figure 7B:
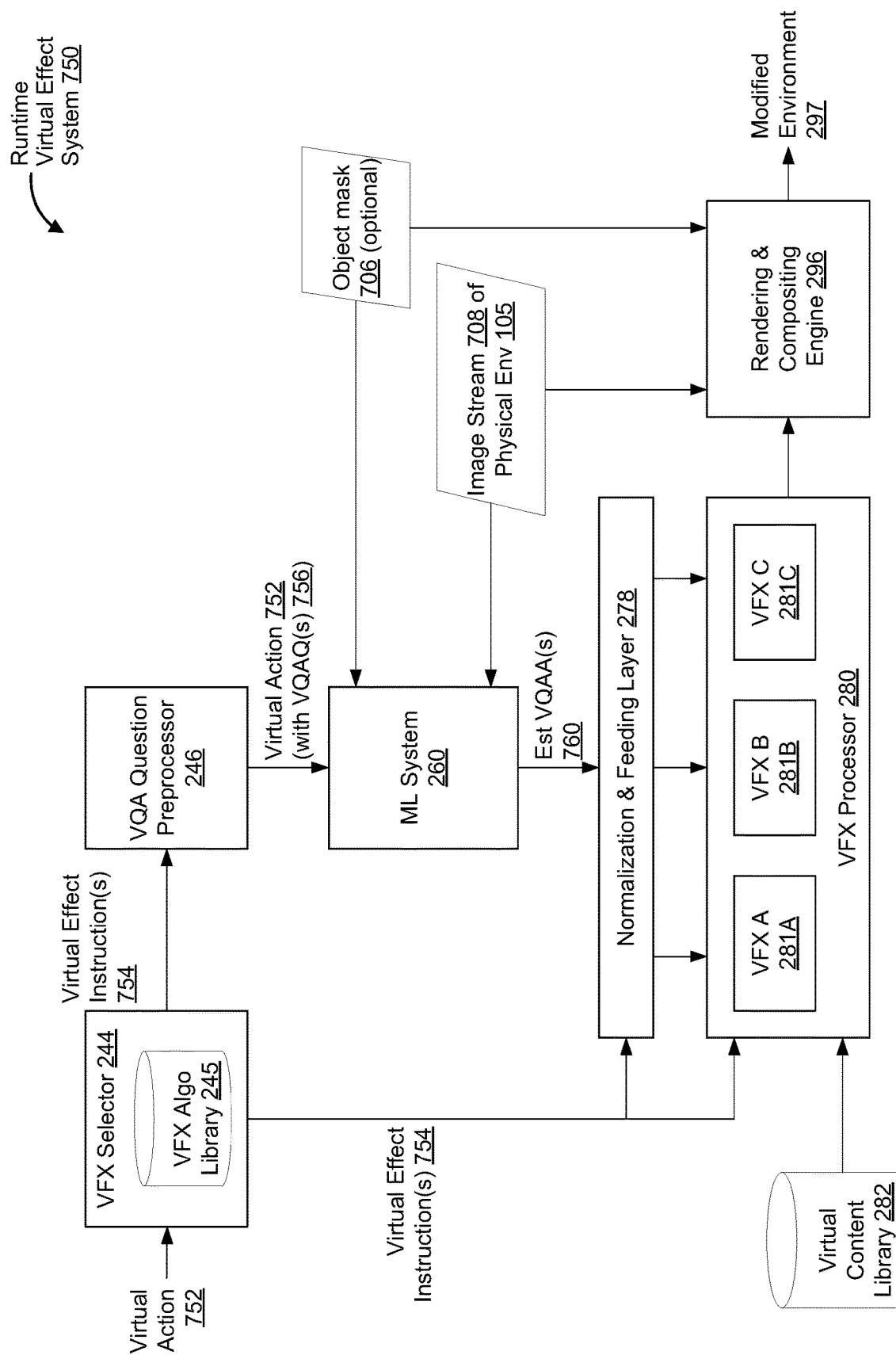
FIG. 7B is a block diagram of a first example runtime virtual effect system in accordance with some implementations.

FIG. 7B is a block diagram of a first example runtime virtual effect system 750 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. At least a portion of the first runtime virtual effect system 750 in FIG. 7B is similar to and adapted from the training dataset generation architecture 500 in FIG. 5. Therefore, similar reference numbers are used herein.

In some implementations, the VFX selector 244 obtains (e.g., receives, retrieves, or determines) one or more virtual effect instructions 754 from the VFX algorithm library 245 based on the input virtual action 752. For example, the runtime virtual effect system 750 may select the input virtual action 752 from a library of virtual actions (e.g., to run a physics simulation). As another example, the runtime virtual effect system 750 may detect selection of the input virtual action 752 from a library of virtual actions by the user 150.

As shown in FIG. 7B, the VQA question preprocessor 246 obtains (e.g., receives, retrieves, or determines/generates) one or more VQA questions (VQAQs) 756 based on the one or more virtual effect instructions 754. As one example, the VQA question preprocessor 246 performs a look-up operation in order to determine the one or more VQA questions 756. As another example, the VQA question preprocessor 246 generates the one or more VQA questions 756 on-the-fly by identifying potential VFX algorithms that may occur based on the input virtual action 752.

In some implementations, the runtime virtual effect system 750 obtains (e.g., receives, retrieves, or captures/generates) the image stream 708 of the physical environment 105 from the image processing architecture 700 in FIG. 7A. In some implementations, the runtime virtual effect system 750 obtains (e.g., receives, retrieves, or captures/generates) the optional object mask 706 from the from the image processing architecture 700 in FIG. 7A. One of ordinary skill in the art will appreciate that the first runtime virtual effect system 750 may operate on a portion of the image stream 708 of the physical environment 105 associated with the optional object mask 706 in some implementations. One of ordinary skill in the art will appreciate that the first runtime virtual effect system 750 may operate on an image-by-image basis without the optional object mask 706 in some implementations.

As shown in FIG. 7B, the ML system 260 ingests the image stream 708 of the physical environment 105 along with the optional object mask 706, the virtual action 752, and the one or more VQA questions 756 and outputs one or more estimated VQA answers 760. As shown in FIG. 7B, the normalization and feeding layer 278 normalizes the values (or the like) associated with the estimated VQA answers 760 and feeds the normalized values or the like to the appropriate virtual effect algorithms 281A, 281B, 281C, . . . of the VFX processor 280 based on the one or more virtual effect instructions 754.

As shown in FIG. 7B, the VFX processor 280 obtains (e.g., receives, retrieves, or determines/generates) one or more virtual effect visualizations based on the estimated VQA answers 760 from the ML system 260 (or the normalized values or the like thereof) and a virtual content library 282. As shown in FIG. 7B, the rendering and compositing engine 296 composites the image stream 708 of the physical environment 105 with the one or more virtual effect visualizations in order to generate a modified environment 297 that includes the one or more virtual effect visualizations.

Figure 7C:
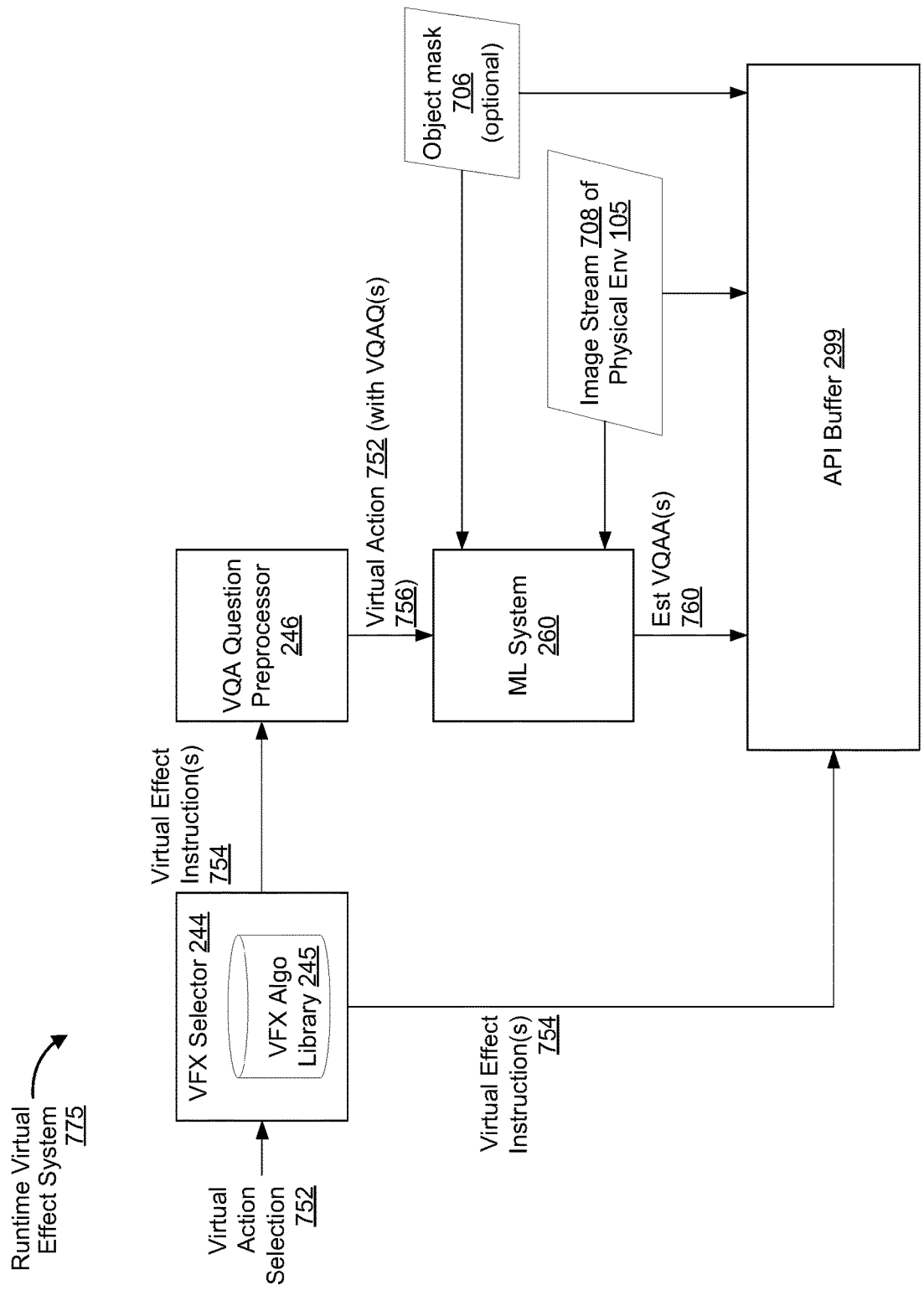
FIG. 7C is a block diagram of a second example runtime virtual effect system in accordance with some implementations.

FIG. 7C is a block diagram of a second example runtime virtual effect system 775 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The second runtime virtual effect system 775 in FIG. 7C is similar to and adapted from the first runtime virtual effect system 750 in FIG. 7B. Therefore, similar reference numbers are used herein and only the differences are described for the sake of brevity.

As shown in FIG. 7C, the API buffer 299 replaces the normalization and feeding layer 278 and the VFX processor 280. In some implementations, the API buffer 299 provides the estimated VQA answers 760 from the ML system 260 in an accessible manner to other applications, developers, and/or the like. In some implementations, the API buffer 299 also provides the one or more virtual effect instructions 754, the image stream 708 of the physical environment 105, and the optional object mask 706.

FIGS. 8A-8D illustrate a sequence of instances 810, 820, 830, and 840 of a virtual effect application scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIGS. 8A-8D, the virtual effect application scenario includes a physical environment 105 and an XR environment 128 displayed on the display 122 of the electronic device 120. The electronic device 120 presents the XR environment 128 to the user 150 while the user 150 is physically present within the physical environment 105 that includes a couch 802, a lamp, and a table within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122. For example, the electronic device 120 corresponds to a mobile phone, tablet, laptop, near-eye system, wearable computing device, or the like.

Figure 8A:
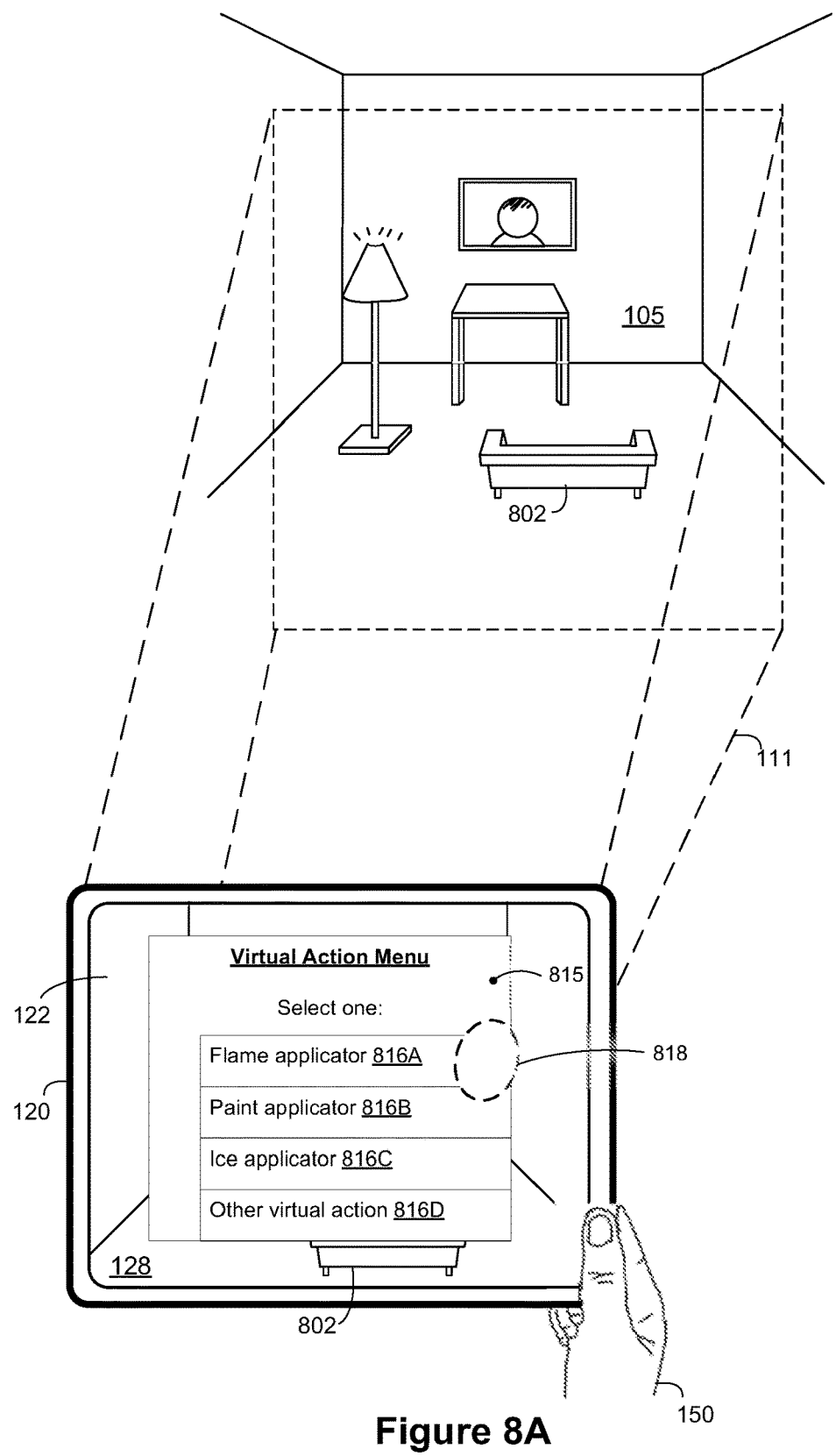
FIGS. 8A-8D illustrate a sequence of instances of a virtual effect application scenario in accordance with some implementations.

As shown in FIG. 8A, during the instance 810 (e.g., associated with time $T_1$) of the virtual effect application scenario, the electronic device 120 displays a virtual action menu 815 overlaid on the XR environment 128. As shown in FIG. 8A, the virtual action menu 815 includes a plurality of user-selectable affordances 816A, 816B, 816C, and 816D associated with various virtual actions that may be taken by the user 150. In FIG. 8A, the electronic device 120 detects a user input 818 (e.g., a single or double tap gesture) at a location the corresponds to the user-selectable affordance 816A associated with the flame applicator virtual action.

Figure 8B:
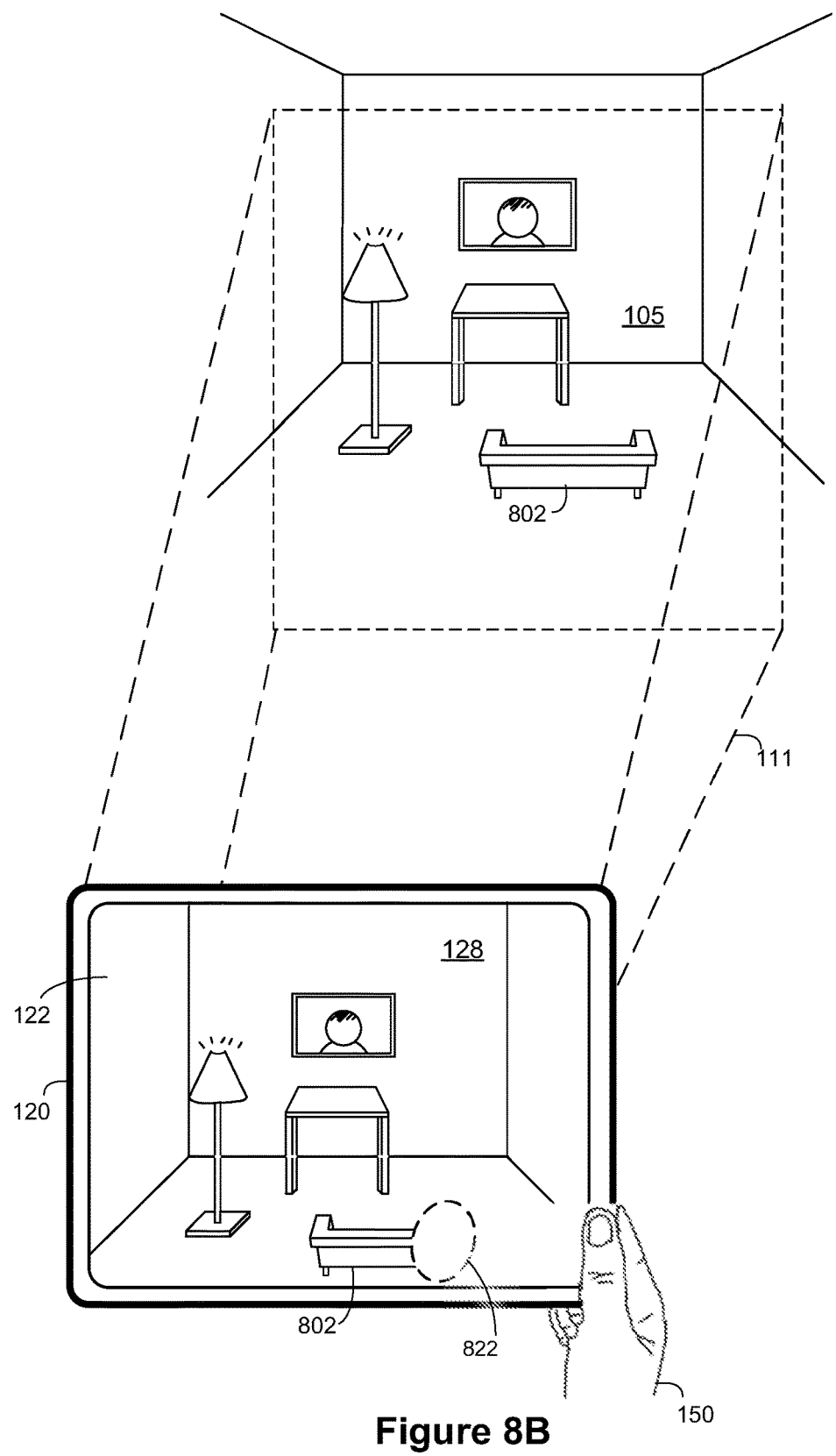

As shown in FIG. 8B, during the instance 820 (e.g., associated with time $T_2$) of the virtual effect application scenario, the electronic device 120 dismisses the virtual action menu 815 in response to detecting the user input 818 in FIG. 8A. In FIG. 8B, the electronic device 120 detects a user input 822 (e.g., a single or double tap gesture) that corresponds to applying the flame applicator virtual action to the couch 802.

Figure 8C:
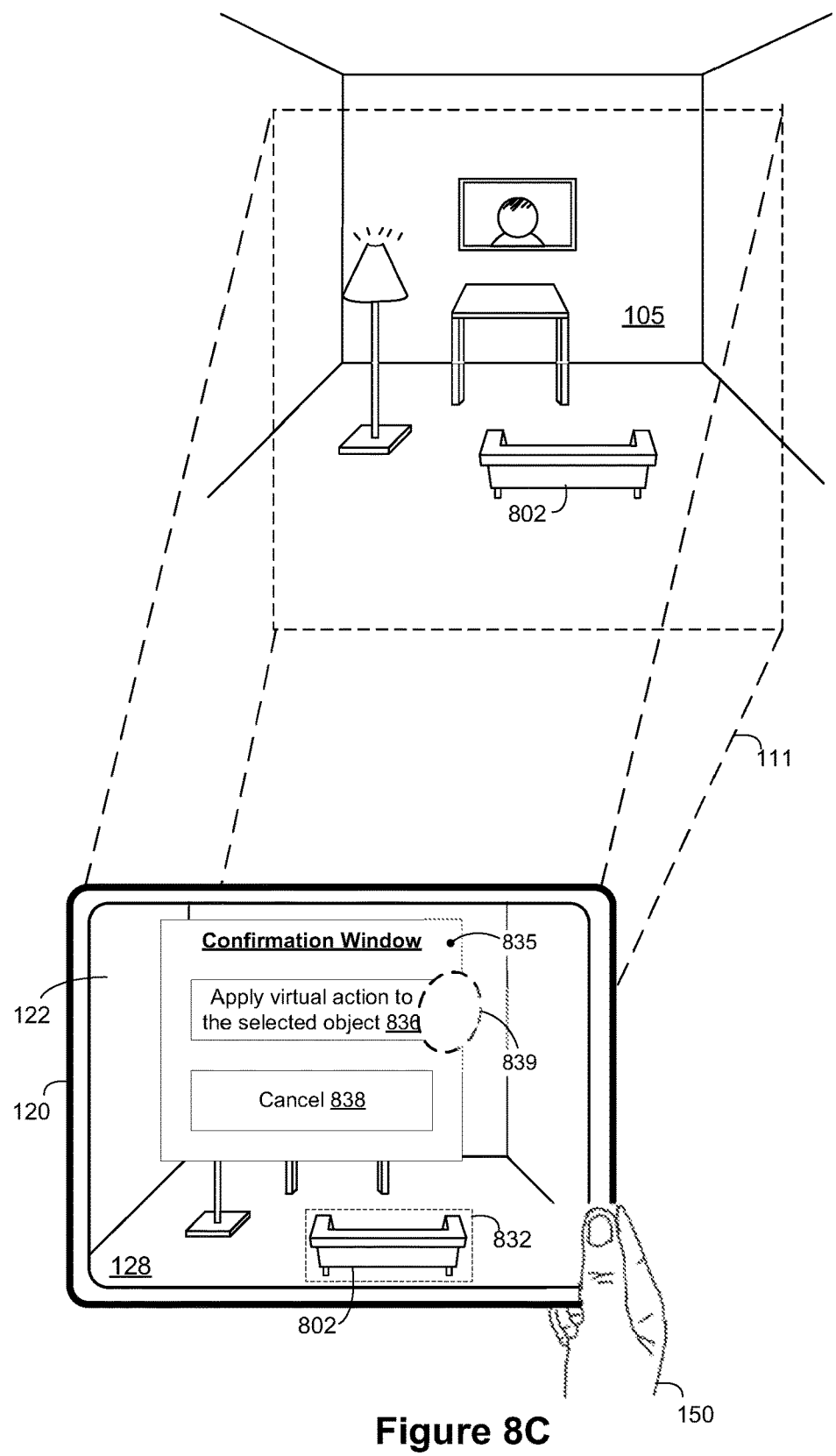

As shown in FIG. 8C, during the instance 830 (e.g., associated with time $T_3$) of the virtual effect application scenario, the electronic device 120 shows an object mask 832 within the XR environment 128 indicating that the couch 802 was selected in response to detecting the user input 822 in FIG. 8B. As shown in FIG. 8C, the electronic device 120 also displays a confirmation window 835 overlaid on the XR environment 128 in response to detecting the user input 822 in FIG. 8B. As shown in FIG. 8C, confirmation window 835 includes: a confirmation affordance 836, which, when selected (e.g., a single or double tap gesture) causes the previously selected virtual action to be applied to the selected object; and a cancel affordance 838, which, when selected (e.g., a single or double tap gesture) cancels application of the previously selected virtual action. In FIG. 8C, the electronic device 120 detects a user input 839 (e.g., a single or double tap gesture) at a location the corresponds to the confirmation affordance 836.

Figure 8D:
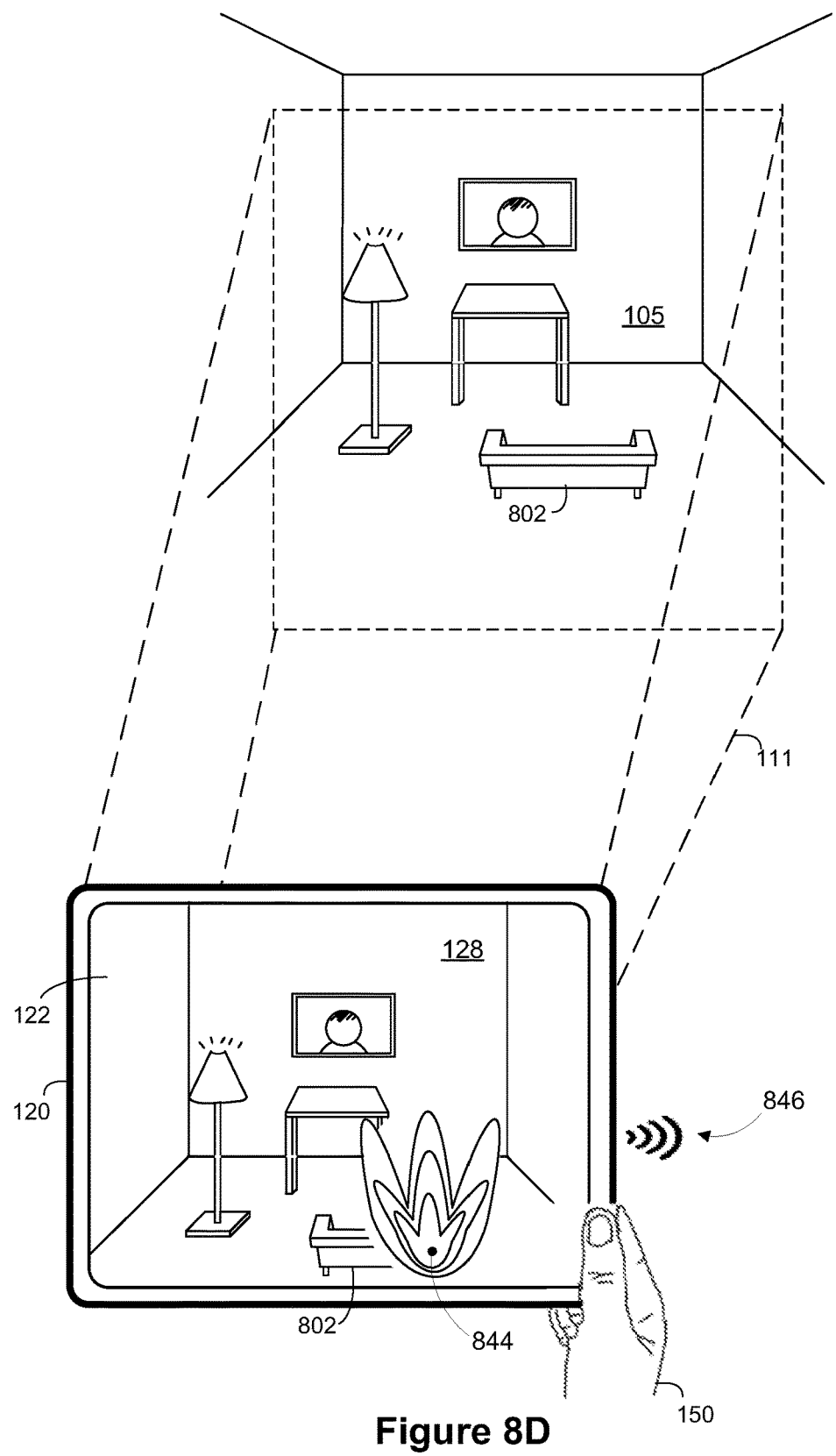

As shown in FIG. 8D, during the instance 840 (e.g., associated with time $T_4$) of the virtual effect application scenario, the electronic device 120 applies the flame applicator virtual effect to the couch 802 in response to detecting the user input 839 in FIG. 8D. In FIG. 8D, the application of the flame applicator virtual action to the couch 802 causes visual flames 844 to be overlaid on the couch 802 within the XR environment 128 and also causes an audible snap and crackle 846 to accompany the visual flames 844.

Figure 9:
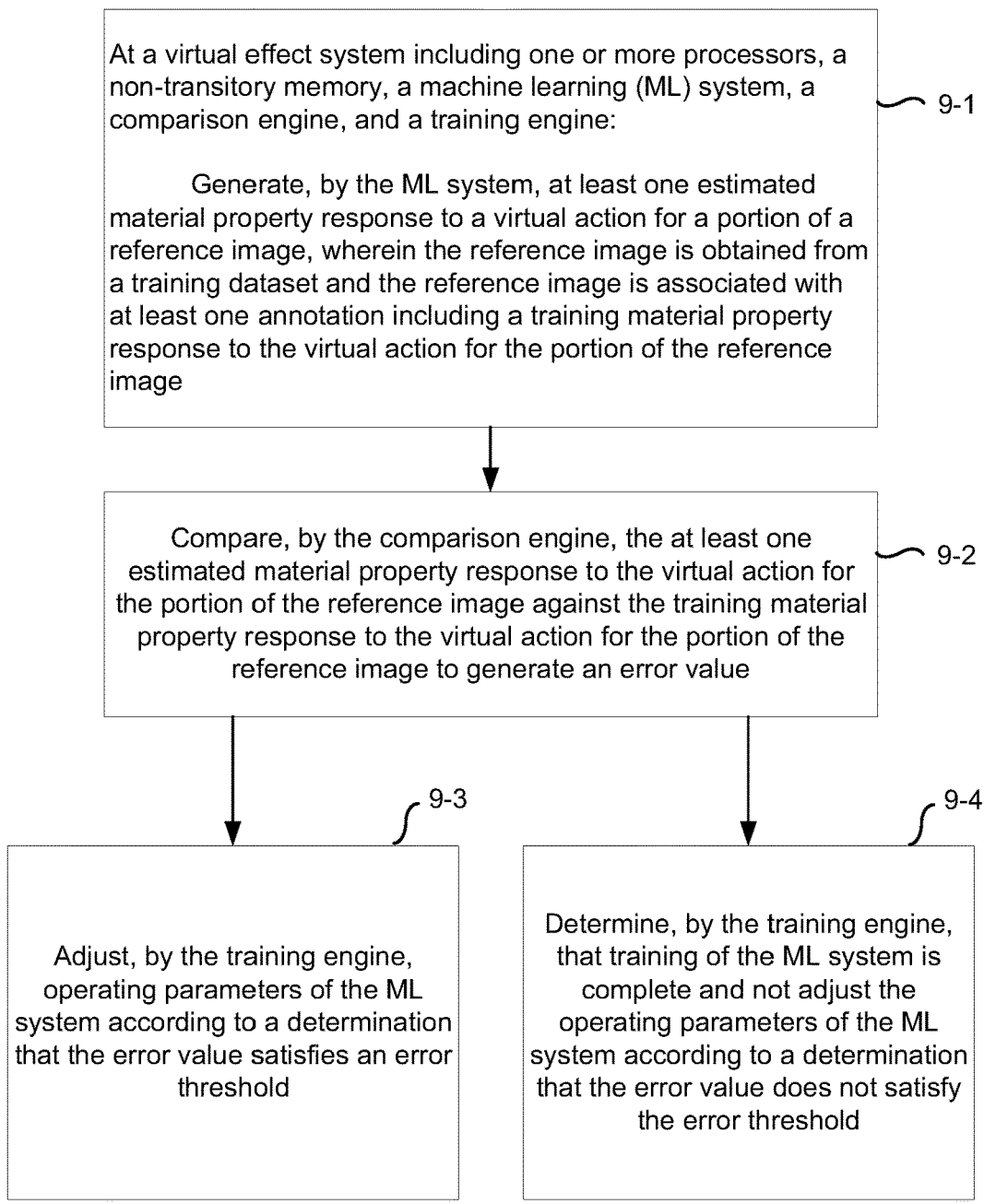
FIG. 9 is a flowchart representation of a method of training the virtual effect system in accordance with some implementations.

FIG. 9 is a flowchart representation of a method 900 of training the virtual effect system in accordance with some implementations. In various implementations, the method 900 is performed by a virtual effect system including one or more processors, a non-transitory memory, an ML system, a comparison engine, and a training engine (e.g., the controller 110 in FIGS. 1 and 2A; the electronic device 120 in FIGS. 1 and 3; or a suitable combination thereof), or a component thereof (e.g., the ML system training architecture 600 in FIG. 6). In some implementations, the method 900 is performed by processing logic, including hardware, firmware, software, or a combination thereof. In some implementations, the method 900 is performed by a processor executing code stored in a non-transitory computer-readable medium (e.g., a memory). In various implementations, some operations in method 900 are, optionally, combined and/or the order of some operations is, optionally, changed.

In some implementations, the virtual effect system includes one or more input devices such as one or more cameras, a touchscreen display, and microphone devices, among others. Camera and microphone devices may respectively capture visual or audio information within or outside ranges of human perception, and may include ultrasonic, infrared, or other frequencies of light or sound. In some implementations, the virtual effect system includes one or more output devices such as speakers, display devices, and haptic feedback motors, among others. Displays may include flat-panel displays, wearable displays with transparent, translucent, or opaque displays, projectors, or other two- or three-dimensional display devices. In some implementations, opaque displays include liquid crystal ("LCD"), light-emitting diode ("LED"), organic light-emitting diode ("OLED"), cathode ray tube ("CRT"), or like displays.

As described above, in some instances, when viewing virtual content (sometimes also herein referred to as "extended reality (XR) content") overlaid on a physical environment, a user may expect a virtual action taken to affect the physical environment. For example, a user viewing a physical fireplace may initiate a virtual action to light a fireplace and expect one or more accompanying virtual effects such as a visual glow, visual flames, visual smoke, crackling sounds, and/or the like. Current systems lack logic to present virtual effects to a user interacting with a representation of the physical environment, and current systems also lack logic to present virtual effects to a user in real-time while the user interacts with the representation of the physical environment. Thus, according some implementations, the method described herein trains a virtual effect system to apply one or more virtual effects to a particular physical surface or object within a physical environment by using generated training data associated with various material properties.

As represented by block 9-1, the method 900 includes generating, by the ML system, at least one estimated material property response to a virtual action for a portion of a reference image, wherein the reference image is obtained from a training dataset and the reference image is associated with at least one annotation including a training material property response to the virtual action for the portion of the reference image. As shown in FIG. 6, the ML system 260 ingests the reference image 510 along with the object mask 508, the virtual action 502, and the one or more VQA questions 506 and outputs one or more estimated VQA answers 602. For example, with reference to FIG. 6, the at least one estimated material property response corresponds to the estimated VQAAs 602. As one example, a virtual action for a flame applicator is associated with ignition, bubbling, smoking, burning, etc. virtual effect instructions.

In some implementations, the ML system corresponds to one of a neural network (NN), a convolutional neural network (CNN), a recurrent neural network (RNN), a deep neural network (DNN), a state vector machine (SVM), a random forest, or the like. In some implementations, the portion of the training image corresponds to a subset of pixels within the reference image that corresponds to an object or surface. In some implementations, the reference image corresponds to a photorealistic/synthetic image or an image of a real-word scene.

In some implementations, the virtual action is associated with one or more virtual effect instructions for modifying a target surface associated with a portion of a physical object or a portion of a physical surface within the portion of the image. In some implementations, a virtual effect instruction includes one or more visual effect algorithms for modifying a physical environment in accordance with a particular mechanical, chemical, electrical or like stimulus. As one example, a virtual effect instruction may include operations for simulating a deformation, particle, or sound effect.

For example, a virtual effect instruction includes one or more machine instructions to effectuate a graphical effect within a virtual environment. In some implementations, machine instructions include assembly or other hardware-centric instructions, high-level compiled language instructions (e.g., C++), interpretive code (e.g., Python, JavaScript), or application programming interface (API) or other computing reference calls or references thereto. In some implementations, a visual or graphical effect includes a visual modification to an object or material associated with an object. In some implementations, a material comprises a type or instance of a physical or virtual substance with particular mechanical, chemical, electrical, or like property. As one example, a material may comprise, flooring, carpeting, wood, stone, steel, plastic, or the like. In some implementations, a training image comprises a real or virtual image including at least one real or virtual material. As one example, a training image may include a photograph of a wooden chair.

In some implementations, a respective virtual effect instruction among the one or more virtual effect instructions corresponds to a deformation effect. In some implementations, a deformation effect includes one or more of a collision impact, a reduction in size from combustion, or like modification of one or more edges, boundaries surfaces or like property of a portion of a virtual effect object.

In some implementations, a respective virtual effect instruction among the one or more virtual effect instructions corresponds to a particle effect. In some implementations, the particle effect includes one or more of a smoke, wind, glowing, dissolving or like effect.

In some implementations, a respective virtual effect instruction among the one or more virtual effect instructions corresponds to an audio effect. In some implementations, the audio effect comprises a crackling fire, bubbling, rustling, burning, exploding, or like effect.

In some implementations, the portion of the reference image is defined by an object mask. For example, the virtual effect system obtains the object mask from a user input, local or remote storage, or the like. As shown in FIG. 4A, the reference image 402 includes an accompanying object mask 404 that highlights or surrounds a wood pile within the reference image 402.

As represented by block 9-2, the method 900 includes comparing, by the comparison engine, the at least one estimated material property response to the virtual action for the portion of the reference image against the training material property response to the virtual action for the portion of the reference image to generate an error value. As shown in FIG. 6, the comparison engine 262 compares one or more estimated VQA answers 602 to the one or more known VQA answers 522 from the training dataset 255 and obtains (e.g., determines, generates, etc.) an error value 604 that corresponds to a difference between the one or more estimated VQA answers 602 and the one or more known VQA answers 522.

In some implementations, the comparison engine compares the estimated values automatically generated by the training engine with target values received from a human trainer. In some implementations, one or more of the estimated values and the values comprise respective vectors or like collection of values. In some implementations, each value in the estimated value vector or the target value vector is associated with a corresponding reference image or a corresponding portion of a reference image. In some implementations, comparing comprises one or more determinations whether an image or a portion of an image includes a material having a particular material property associated with a particular virtual effect instruction at a particular confidence level. In some implementations, a training threshold comprises a level of deviation between one or more estimated or computer-generated values and one or more actual or predetermined values corresponding to one or more material properties. In some implementations, an actual or predetermined value comprises a value received from a human trainer.

As represented by block 9-3, the method 900 includes adjusting, by the training engine, operating parameters of the ML system according to a determination that the error value satisfies an error threshold. As shown in FIG. 6, the training engine 264 adjusts one or more operating parameters 606 of the ML system 260 (e.g., filter weights and/or the like) according to a determination that the error value 604 satisfies an error threshold. In some implementations, the operating parameters correspond to filter weights of a neural network. In some implementations, the adjustment engine determines what operating parameters to adjust and by how much based on the error value and the at least one estimated material property response. In some implementations, the error value satisfies the error threshold when the error value is greater than or equal to the error threshold. In some implementations, the error threshold corresponds to a predefined value associated with the accuracy of confidence in the result of the ML system. In some implementations, the error threshold corresponds to a deterministic value associated with the accuracy of confidence in the result of the ML system.

As represented by block 9-4, the method 900 includes determining, by the training engine, that training of the ML system is complete and not adjusting (e.g., forgoing adjusting) the operating parameters of the ML system according to a determination that the error value does not satisfy the error threshold. As shown in FIG. 6, the training engine 264 ends the training process and does not adjust the one or more operating parameters 606 of the ML system 260 according to a determination that the error value 604 does not satisfy the error threshold. In some implementations, the error value does not satisfy the error threshold when the error value is less than the error threshold.

In some implementations, the virtual effect system further includes a training data generator, and the method further comprises: generating, by the training data generator, annotations associated with the reference image by: (A) obtaining the virtual action to modify an appearance of at least a portion of a reference image; (B) generating at least one material property query associated with the virtual action; (C) obtaining at least one training material property response to the material property query, wherein the training material property response is associated with at least the portion of the reference image; and (D) associating the annotations with the portion of the reference image including the material property query and the training material property response. As shown in FIG. 5, the training dataset generation architecture 500 generates the training dataset 255 using an annotation process described in FIGS. 4A and 4B. In some implementations, the training dataset generation architecture 500 is also referred to as the training data generator.

In some implementations, the training data generator is provided to perform at least one of receive, modify, convert, annotate, organize, generate, or like operations with respect to received inputs. In some implementations, a material property query includes a prompt eliciting information regarding one or more of a mechanical, chemical, electrical, or like property of a particular material. As one example, a material property query may ask, "Does it burn?" In some implementations, a target value comprises a training material property response. In some implementations, the training material property response includes one or more selections of permitted responses to the material property query. As one example, the material property query "Does it burn?" may be associated with two permitted responses, "yes" and "no." In this example, a material property response may be "yes" to a prompt comprising the reference image of the photograph of the wooden chair and the material property query "Does it burn?" In some implementations, the training data generator presents the reference image and the material property query to a human user. The training data generator then receives the training material property response as a response from the user to a prompt including the reference image and the material property query. In some implementations, the training data generator presents a portion of the reference image known to contain a target material.

In some implementations, the training data generator comprises a visual question-and-answer (VQA) engine, and wherein the material property query corresponds to a VQA question associated with the portion of the reference image, and the training material property response corresponds to at least one VQA answer to the VQA question. In some implementations, the training dataset generation architecture 500 comprises a visual question-and-answer (VQA) engine. In some implementations, the material property query comprises a VQA question. As one example, a VQA question may ask, "Does it burn?" In some implementations, either or both of the actual material property response and the estimated material property response comprise a VQA answer. As one example, an actual or estimated VQA answer to the VQA question "Does it burn?" may be "yes" or "no."

In some implementations, the VQA question comprises at least one yes-or-no, true-or-false, multiple choice, slider, fill-in-the-blank, or drawing selection, and the VQA answer comprises one or more selections within a prompt associated with the VQA question. As shown in FIG. 4A, the annotation prompt window 425 includes VQAQs 410, 412, 414, 420, 422, 430, and 432. In this example the VQAAs correspond to the values to the user manipulatable portions of the annotation prompt window 425.

In some implementations, a VQA question may be associated with one or more potential responses, and a VQA answer may include one or more selections of the potential responses to the VQA question. As one example, a VQA question may take the form of a yes-or-no, true-or-false, or multiple-choice selection. As one example, a VQA question may ask "What is this building made of?" and an actual or estimated VQA response may be one or more selections including "glass," "concrete," "steel" and "wood." In some implementations, a VQA question may include a designation of a value or tier within a predetermined range. As one example, a VQA question may ask "How hot is the weather?" and an actual or estimated VQA response may include any number between −40 degrees Fahrenheit and +120 degrees Fahrenheit.

In some implementations, the VQA question comprises at least one drawing prompt and the VQA answer comprises at least one selection of a portion of the image. In some implementations, a VQA question includes a prompt for selection of a portion of an image and a VQA answer includes a selection of a portion of the image. As one example, a VQA question may be "Select what burns," and an associated VQA response may be one or more circles, polygons, freehand shapes or the like drawn around one or more portions of the image.

In some implementations, obtaining the VQA answer comprises obtaining the VQA answer based on one or more user inputs. In some implementations, the training dataset generation architecture 500 presents to the human user a reference image or a portion of a reference image (e.g., the reference image 402 shown in FIG. 4A), and VQA questions associated with the reference image or portion thereof (e.g., the annotation prompt window 425 shown in FIG. 4A). In response, the training dataset generation architecture 500 receives one or more VQA answers from the human user. Put another way, in some implementations, the training dataset generation architecture 500 presents a reference image or a portion of a reference image to the human user, and a material property query associated with the reference image or portion thereof. In response, the human user receives one or more training material property responses from the human user.

In some implementations, each reference image in the training dataset is associated with a set of annotations, and wherein a respective portion of a respective reference image in the training dataset is associated with a subset of the set of annotations associated with the reference image. FIG. 4B illustrates an example data structure for a portion 450 of the training dataset 255 for a reference image 402 in accordance with some implementations. As such, for example, the training dataset 255 may include a plurality of reference images each with a set of annotations provided by the user via the VQA annotation process described above. One of ordinary skill in the art will appreciate that the training dataset 255 may be associated with a single domain for task-specific training (e.g., a specific virtual action) or may be constructed for generic training in order to train a multi-task learner.

In some implementations, the reference image comprises one or more reference materials and the portion of the reference image comprises one or more portions each associated with a corresponding one of the reference materials. In some implementations, the subset of annotations associated with a portion of a reference image include a material property response, a material property query associated with the material property response, and a visual effect instruction associated with the material property query. In some implementations, either or both of the training data architecture and training engine include or are communicatively coupled with a training dataset. In some implementations, the training dataset comprises a set of annotations for each reference image. In some implementations, the training dataset generation architecture 500 fragments the reference image by known reference material and shows multiple portions of the reference image in a prompt with the material property query. In this way, in some implementations, the training dataset generation architecture 500 elicits and associates a distinct material property response with each of the multiple portions of the reference image.

Figure 10:
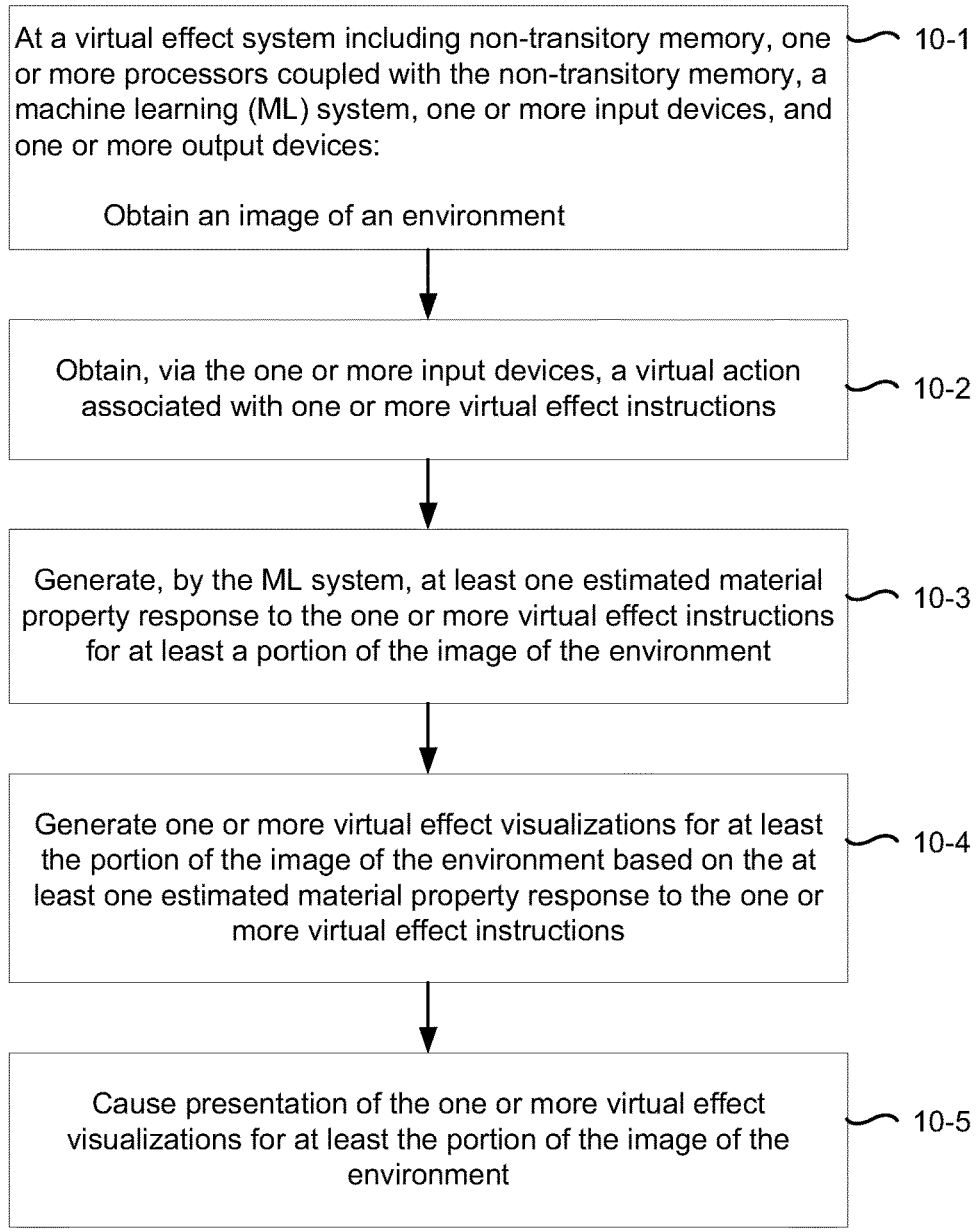
FIG. 10 is a flowchart representation of a method of causing the application of a virtual effect in accordance with some implementations.

FIG. 10 is a flowchart representation of a method 1000 of causing the application of a virtual effect in accordance with some implementations. In various implementations, the method 1000 is performed by a virtual effect system including non-transitory memory, one or more processors coupled with the non-transitory memory, an ML system, one or more input devices, and one or more output devices (e.g., the controller 110 in FIGS. 1 and 2A; the electronic device 120 in FIGS. 1 and 3; or a suitable combination thereof), or a component thereof (e.g., the first runtime virtual effect system 750 in FIG. 7B, or the second runtime virtual effect system 775 in FIG. 7C). In some implementations, the method 1000 is performed by processing logic, including hardware, firmware, software, or a combination thereof. In some implementations, the method 1000 is performed by a processor executing code stored in a non-transitory computer-readable medium (e.g., a memory). In various implementations, some operations in method 1000 are, optionally, combined and/or the order of some operations is, optionally, changed.

As described above, in some instances, when viewing virtual content overlaid on a physical environment, a user may expect a virtual action taken to affect the physical environment. For example, a user viewing a physical fireplace may initiate a virtual action to light a fireplace and expect one or more accompanying virtual effects such as a visual glow, visual flames, visual smoke, crackling sounds, and/or the like. Current systems lack logic to present virtual effects to a user interacting with a representation of the physical environment, and current systems also lack logic to present virtual effects to a user in real-time while the user interacts with the representation of the physical environment. Thus, according some implementations, the method described herein enables a virtual effect system to identify a portion of an image associated with a virtual action and apply the virtual effects to the portion of the image during runtime.

As represented by block 10-1, the method 1000 includes obtaining, via the one or more input devices, an image of an environment. As shown in FIG. 7A, the image processing architecture 700 or a component thereof (e.g., the image capture device 270) captures one or more images of the physical environment 105 (or, alternatively, a partially or fully XR environment). As shown in FIG. 7A, the image processing architecture 700 is also configured to perform image pre-processing and/or optional contextual analysis during runtime. In some implementations, obtaining includes one or more of receiving data or metadata from an external device, node, or server; retrieving data or metadata from a local memory or an external device, node or server; or generating data or metadata at a local device.

In some implementations, the environment corresponds to a physical environment, a partially XR environment, a fully XR environment, or the like. In some implementations, the XR environment includes one or more virtual objects, images, text, animations, of the like. In some implementations, an optical see-through display includes a wearable display with a transparent or semi-transparent surface. The transparent or semi-transparent surface can allow an environment on one side of the surface to be visible from an opposite side of the surface. In some implementations, the XR environment is a composite of a video feed of a physical environment with XR content.

In some implementations, the environment corresponds to a extended reality (XR) environment. In some implementations, obtaining includes one or more of receiving data or metadata from an external device, node, or server; retrieving data or metadata from a local memory or an external device, node or server; or generating data or metadata at a local device. In some implementations, visual content includes one or more virtual objects, images, text, animations, of the like. In some implementations, an optical see-through display includes a wearable display with a transparent or semi-transparent surface. The transparent or semi-transparent surface can allow an environment on one side of the surface to be visible from an opposite side of the surface. In some implementations, the XR environment is a composite of a video feed of a physical environment with XR content.

In some implementations, the image of the environment corresponds to one or more still images or a video feed of a physical environment. In some implementations, the image comprises one or more still images, or live or prerecorded video. In some implementations, the environment corresponds to one of a physical environment, a virtual environment, or a combination thereof. In some implementations, the image comprises a physical, virtual, augmented, mixed, or like reality experience.

As represented by block 10-2, the method 1000 includes obtaining, via the one or more input devices, a virtual action associated with one or more virtual effect instructions. As shown in FIGS. 7B and 7C, the virtual effect systems 750 and 775, respectively, obtain an input virtual action 752. For example, with reference to FIG. 7B, the runtime virtual effect system 750 may select the input virtual action 752 from a library of virtual actions (e.g., to run a physics simulation). As another example, with reference to FIG. 7B, the runtime virtual effect system 750 may detect selection of the input virtual action 752 from a library of virtual actions by the user 150.

In some implementations, a virtual action is a virtual change to a real, virtual, mixed or like environment represented in an image. In some implementations, a virtual action comprises one or more graphical effects associated with one or more virtual effect instructions. As one example, a virtual action may be to apply a virtual "flame applicator" effect to a room. As another example, a virtual action may be to "light a fireplace" or "light a room" having, a fireplace or candle therein. In some implementations, an input associates a virtual action with a portion of an image by selecting at least one point in the image or by drawing at least one boundary shape around a target area of an image. In some implementations, a boundary shape includes a square, rectangle, circle, oval, or other polygon. In some implementations, the boundary shape includes a freeform hand-drawn shape. In some implementations, a user input associates an entire image with a virtual action by selecting substantially the entire image, by making no selection of any portion of the image, or by selecting a virtual action operable only on an entire image.

In some implementations, a virtual effect instruction includes one or more machine instructions to effectuate a graphical effect within a virtual environment. In some implementations, machine instructions include assembly or other hardware-centric instructions, high-level compiled language instructions (e.g., C++), interpretive code (e.g., Python, JavaScript), or application programming interface (API) or other computing reference calls or references thereto. In some implementations, a visual or graphical effect includes a visual modification to an object or material associated with an object. In some implementations, a material comprises a type or instance of a physical or virtual substance with particular mechanical, chemical, electrical, or like property. As one example, a material may comprise, flooring, carpeting, wood, stone, steel, or plastic. In some implementations, material properties include visually detectable mechanical, chemical, electrical or like properties. In some implementations, material properties include combustibility, conductivity, reflectivity, smoke point, melting point, freezing point, or the like.

In some implementations, the one or more virtual effect instructions correspond to one or more instructions for modifying a target surface associated with a portion of a physical object or a portion of a physical surface within the portion of the image. In some implementations, a virtual effect instruction includes one or more visual effect algorithms for modifying an environment in accordance with a particular mechanical, chemical, electrical or like stimulus. As one example, a virtual effect instruction may include operations for simulating a deformation, particle, or sound effect.

In some implementations, a respective virtual effect instruction among the one or more virtual effect instructions corresponds to a deformation effect. For example, the deformation effect includes one or more of a collision impact, a reduction in size from combustion, or like modification of one or more edges, boundaries surfaces or like property of a portion of a virtual effect object.

In some implementations, a respective virtual effect instruction among the one or more virtual effect instructions corresponds to a particle effect. For example, the particle effect includes one or more of a smoke, wind, glowing, dissolving or like effect.

In some implementations, a respective virtual effect instruction among the one or more virtual effect instructions corresponds to an audio effect. For example, the audio effect includes a crackling fire, bubbling, rustling, burning, exploding, or like effect.

As represented by block 10-3, the method 1000 includes generating, by the ML system, at least one estimated material property response to the one or more virtual effect instructions for at least a portion of the image of the environment. As shown in FIG. 7B, for example, the ML system 260 ingests the image stream 708 of the physical environment 105 along with the optional object mask 706, the virtual action 752, and the one or more VQA questions 756 and outputs one or more estimated VQA answers 760 (e.g., the estimated material property responses). In some implementations, the ML system is trained on a specific domain or task. In some implementations, the ML system is trained to generic or task-agnostic.

In some implementations, the ML system corresponds to one of a neural network (NN), a convolutional neural network (CNN), a recurrent neural network (RNN), a deep neural network (DNN), a state vector machine (SVM), or a random forest. In some implementations, a training engine comprises a machine learning, neural network, artificial intelligence, genetic algorithm, or the like.

In some implementations, the trained ML system identifies whether a portion of an image, video, scene, or the like corresponding to one or more material properties associated with a virtual effect instruction for a virtual action. As one example, the trained ML system may examine a scene for a "combustible" material property associated with a "catch fire" virtual effect instruction for a "flamethrower" virtual action. In some implementations, environment material properties comprise material properties identified as present in an image, video, scene, or the like.

As represented by block 10-4, the method 1000 includes generating one or more virtual effect visualizations for at least the portion of the image of the environment based on the at least one estimated material property response to the one or more virtual effect instructions. As shown in FIG. 7B, for example, the VFX processor 280 obtains (e.g., receives, retrieves, or determines/generates) one or more virtual effect visualizations based on the estimated VQA answers 760 from the ML system 260 (or the normalized values or the like thereof) and a virtual content library 282.

In some implementations, the one or more virtual effect visualizations correspond to a computer-generated reproduction, replica, approximation, or like representation of an image or a portion of an image. As one example, a virtual effect visualization of a portion of an image including an unlit fireplace may include the fireplace hearth, fireplace logs, and fireplace stand within the fireplace. In some implementations, the VFX processor receives image information and corresponding virtual effect instruction information. In some implementations, the VFX processor provides image information including a particular environment material property to a corresponding virtual effect operation block, module, sub-processor, or the like, within a virtual effect processor. In some implementations, the VFX processor executes one or more virtual effect instructions on one or more portions of a virtual object associated with corresponding environment material properties. In some implementations, the one or more virtual effect visualizations may be accompanied by audio, haptic, and/or the like effects.

In some implementations, generating the one or more virtual effect visualizations includes providing a first portion of estimated material property responses to a first virtual effect algorithm associated with a first virtual effect instruction, and providing a second portion of the estimated material property responses to a second virtual effect algorithm associated with a second virtual effect instruction. As shown in FIG. 7B, for example, the normalization and feeding layer 278 normalizes the values (or the like) associated with the estimated VQA answers 760 and feeds the normalized values or the like to the appropriate virtual effect algorithms 281A, 281B, 281C, . . . of the VFX processor 280 based on the one or more virtual effect instructions 754. In some implementations, the normalization and feeding layer 278 receives the estimated material property responses and, then, normalizes those values and feeds them to the appropriate virtual effect algorithms associated with the virtual effect instructions. In some implementations, the virtual effect algorithms 281A, 281B, 281C, . . . operate independently, in parallel, or in a serial manner to execute each respective virtual effect instruction.

In some implementations, generating the estimated material property response further comprises isolating the portion of the image associated with the virtual action. In some implementations, isolating the portion of the image comprises applying one or more image comprehension or scene comprehension techniques to the image. As shown in FIG. 7B, the runtime virtual effect system 750 obtains (e.g., receives, retrieves, or captures/generates) the optional object mask 706 from the from the image processing architecture 700 in FIG. 7A. One of ordinary skill in the art will appreciate that the first runtime virtual effect system 750 may operate on a portion of the image stream 708 of the physical environment 105 associated with the optional object mask 706 in some implementations. One of ordinary skill in the art will appreciate that the first runtime virtual effect system 750 may operate on an image-by-image basis without the optional object mask 706 in some implementations.

In some implementations, isolating the portion of the image is based at least in part on performing at least one of object recognition or semantic segmentation on at least the portion of the image of the environment. In some implementations, the isolating comprises semantic and/or instance segmentation by detecting particular objects, edges, boundaries, shapes, changes in contrast or brightness, or the like.

In some implementations, isolating the portion of the image is based at least in part on isolating one or more pixels within at least the portion of the image of the environment. In some implementations, the isolating comprises grouping one or more pixels based on brightness, color, contrast, shape, arrangement, or the like.

In some implementations, isolating the portion of the image is based at least in part on identifying one or more planes associated with one or more physical surfaces within at least the portion of the image of the environment. In some implementations, the isolating comprises identifying one or more planar surfaces in the image associated with a physical environment. In some implementations, identifying planar surfaces comprises identifying an orientation of a planar surface within the physical environment, boundaries of a planar surface in the physical environment, and location of the planar surface in the physical environment. As one example, a plane may include a plane coterminous with a wall, tabletop, step, or the like within a room.

As represented by block 10-5, the method 1000 includes causing presentation of the one or more virtual effect visualizations for at least the portion of the image of the environment. As shown in FIG. 7B, for example, the rendering and compositing engine 296 composites the image stream 708 of the physical environment 105 with the one or more virtual effect visualizations in order to generate a modified environment 297 that includes the one or more virtual effect visualizations.

In some implementations, causing presentation of the one or more virtual effect visualizations may include presenting audio, video, text, augmented reality objects or events, virtual reality objects or events, or other similar static or dynamic content. In some implementations, the one or more virtual effect visualizations are composited with the image of the physical environment at the appropriate location. In some implementations, causing presentation of the one or more virtual effect visualizations includes storing the at least one estimated material property response and/or the one or more virtual effect visualizations in an API buffer accessible to other applications, developers, and/or the like (e.g., the API buffer 299 shown in FIG. 7C).

In some implementations, the one or more virtual effect visualizations for at least the portion of the image of the environment are overlaid on the image of the environment in real-time. As one example, in FIG. 8D, the application of the flame applicator virtual action to the couch 802 causes visual flames 844 to be overlaid on the couch 802 within the XR environment 128 and also causes an audible snap and crackle 846 to accompany the visual flames 844. In some implementations, presenting the one or more virtual effect visualizations objects occurs in real time. In some implementations, a user perceives the one or more virtual effect visualizations as if the object were within that environment. In some implementations, the user is able to interact with the one or more virtual effect visualizations in real time.

In some implementations, the one or more virtual effect visualizations correspond to application of a virtual effect to a representation of at least one of a portion of a physical object and a portion of a physical surface. In some implementations, a physical object and a physical surface appear within an image of a physical environment. As one example, a physical piece of firewood is a physical object in an image of a room including a fireplace including firewood.

In some implementations, the one or more virtual effect visualizations partially obscure or are presented proximate to at least one of the portion of the physical object and the portion of the physical surface. In some implementations, a virtual effect object and a modified virtual effect object are overlaid upon a physical object in an image of a physical environment. As one example, a virtual effect object comprising an unlit virtual piece of firewood is overlaid upon the physical piece of firewood in the image as a virtual effect object. As another example, a virtual burning piece of firewood is overlaid upon the physical piece of firewood in the image as a modified virtual effect object.

In some implementations, the one or more virtual effect visualizations are presented within the XR environment including presenting at least a first virtual effect visualization while at least a second virtual effect visualization is outside of a field of view associated with the XR environment. In some implementations, presenting the modified virtual object includes presenting the modified virtual objects in accordance with its position in the XR environment persistently as the viewable area of the XR changes. As one example, a user may affect the virtual action of "light fireplace" in a physical room containing a physical fireplace in an unlit state. As the user moves around in the room or changes a direction of view within the room, the view of the XR environment changes. As the XR environment changes, the fireplace with an "ignited fireplace" virtual effect object may move partially or entirely out of view while the virtual effects remain. In this example, virtual effects may include light, smoke, sound, or the like emanating from a virtual lit fireplace either partially or completely out of view.

In some implementations, the method 1000 includes determining at least one material property associated with the portion of the image of the environment based on the one or more virtual effect instructions and the least one estimated material property response to the one or more virtual effect instructions. In some implementations, the system infers a material property of a portion of an image based at least in part on its material property response.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a virtual effect system including non-transitory memory, one or more processors coupled with the non-transitory memory, a machine learning (ML) system, one or more input devices, and one or more output devices:
obtaining, via the one or more input devices, an image of an environment;
obtaining, via the one or more input devices, a virtual action associated with one or more virtual effect instructions;
generating, by the ML system, at least one estimated material property response to the one or more virtual effect instructions for at least a portion of the image of the environment;
generating one or more virtual effect visualizations for at least the portion of the image of the environment based on the at least one estimated material property response to the one or more virtual effect instructions; and
causing presentation of the one or more virtual effect visualizations for at least the portion of the image of the environment.

2. The method of claim 1, wherein the one or more virtual effect instructions correspond to one or more instructions for modifying a target surface associated with a portion of a physical object or a portion of a physical surface within the portion of the image.

3. The method of claim 2, wherein a respective virtual effect instruction among the one or more virtual effect instructions corresponds to a deformation effect.

4. The method of claim 2, wherein a respective virtual effect instruction among the one or more virtual effect instructions corresponds to a particle effect.

5. The method of claim 2, wherein a respective virtual effect instruction among the one or more virtual effect instructions corresponds to an audio effect.

6. The method of claim 1, further comprising:
determining at least one material property associated with the portion of the image of the environment based on the one or more virtual effect instructions and the least one estimated material property response to the one or more virtual effect instructions.

7. The method of claim 1, wherein the one or more virtual effect visualizations for at least the portion of the image of the environment are overlaid on the image of the environment in real-time.

8. The method of claim 1, wherein generating the one or more virtual effect visualizations includes:
providing a first portion of estimated material property responses to a first virtual effect algorithm associated with a first virtual effect instruction; and
providing a second portion of the estimated material property responses to a second virtual effect algorithm associated with a second virtual effect instruction.

9. The method of claim 1, wherein the one or more virtual effect visualizations correspond to application of a virtual effect to a representation of at least one of a portion of a physical object and a portion of a physical surface.

10. The method of claim 9, wherein the one or more virtual effect visualizations partially obscure or are presented proximate to at least one of the portion of the physical object and the portion of the physical surface.

11. The method of claim 1, wherein the environment corresponds to an extended reality (XR) environment.

12. The method of claim 11, wherein the one or more virtual effect visualizations are presented within the XR environment including presenting at least a first virtual effect visualization while at least a second virtual effect visualization is outside of a field of view associated with the XR environment.

13. The method of claim 1, wherein the image of the environment corresponds to one or more still images or a video feed of a physical environment.

14. The method of claim 1, wherein the environment corresponds to one of a physical environment, a virtual environment, or a combination thereof.

15. The method of claim 1, wherein the ML system corresponds to one of a neural network (NN), a convolutional neural network (CNN), a recurrent neural network (RNN), a deep neural network (DNN), a state vector machine (SVM), or a random forest.

16. The method of claim 1, wherein generating the estimated material property response further comprises isolating the portion of the image associated with the virtual action.

17. The method of claim 16 wherein isolating the portion of the image is based at least in part on performing at least one of object recognition or semantic segmentation on at least the portion of the image of the environment.

18. The method of claim 16, wherein isolating the portion of the image is based at least in part on isolating one or more pixels within at least the portion of the image of the environment.

19. The method of claim 18, wherein isolating the portion of the image is based at least in part on identifying one or more planes associated with one or more physical surfaces within at least the portion of the image of the environment.

20. A virtual effect system comprising:
a machine learning (ML) system;
one or more input devices;
one or more output devices;
one or more processors;
a non-transitory memory; and
one or more programs stored in the non-transitory memory, which, when executed by the one or more processors, cause the virtual effect system to:
obtain, via the one or more input devices, an image of an environment;
obtain, via the one or more input devices, a virtual action associated with one or more virtual effect instructions;
generate, by the ML system, at least one estimated material property response to the one or more virtual effect instructions for at least a portion of the image of the environment;
generate one or more virtual effect visualizations for at least the portion of the image of the environment based on the at least one estimated material property response to the one or more virtual effect instructions; and cause presentation of the one or more virtual effect visualizations for at least the portion of the image of the environment.

21. A non-transitory memory storing one or more programs, which, when executed by one or more processors of a virtual effect system with a machine learning (ML) system, one or more input devices, and one or more output devices, cause the virtual effect system to:
- obtain, via the one or more input devices, an image of an environment;
- obtain, via the one or more input devices, a virtual action associated with one or more virtual effect instructions;
- generate, by the ML system, at least one estimated material property response to the one or more virtual effect instructions for at least a portion of the image of the environment;
- generate one or more virtual effect visualizations for at least the portion of the image of the environment based on the at least one estimated material property response to the one or more virtual effect instructions; and
- cause presentation of the one or more virtual effect visualizations for at least the portion of the image of the environment.

\* \* \* \* \*